(12) United States Patent
Ekonen et al.

(10) Patent No.: US 11,890,927 B2
(45) Date of Patent: Feb. 6, 2024

(54) TWIN CLUTCH TWO SPEED DISCONNECT RDU

(71) Applicant: LINAMAR CORPORATION, Guelph (CA)

(72) Inventors: Todd Ekonen, Brighton, MI (US); Michael Burr, Farmington, MI (US); Mitchell Holland, Royal Oak, MI (US); Kyle Milliman, Farmington Hills, MI (US); Gary Monkaba, Troy, MI (US); Evan Swinger, Farmington Hills, MI (US); Jayson Allison, Livonia, MI (US); Sean Hayes, Livonia, MI (US); Simon Joliff, Livonia, MI (US); Joe Schaffer, New Hudson, MI (US)

(73) Assignee: Linamar Corporation, Guelph (CA)

( * ) Notice: Subject to any disclaimer, the term of this patent is extended or adjusted under 35 U.S.C. 154(b) by 0 days.

(21) Appl. No.: 17/428,673

(22) PCT Filed: Feb. 5, 2020

(86) PCT No.: PCT/US2020/016851
§ 371 (c)(1),
(2) Date: Aug. 5, 2021

(87) PCT Pub. No.: WO2020/163505
PCT Pub. Date: Aug. 13, 2020

(65) Prior Publication Data
US 2022/0118847 A1 Apr. 21, 2022

Related U.S. Application Data

(60) Provisional application No. 62/801,384, filed on Feb. 5, 2019.

(51) Int. Cl.
*B60K 17/04* (2006.01)
*B60K 17/02* (2006.01)
(Continued)

(52) U.S. Cl.
CPC ............ *B60K 17/046* (2013.01); *B60K 17/02* (2013.01); *B60K 17/165* (2013.01);
(Continued)

(58) Field of Classification Search
CPC ..... F16H 2200/0034; F16H 2200/2005; F16H 2200/02052; F16H 2021/0661;
(Continued)

(56) References Cited

U.S. PATENT DOCUMENTS

4,424,874 A * 1/1984 Koike ..................... F16H 48/08
180/370
2013/0303324 A1 11/2013 Valente et al.
(Continued)

FOREIGN PATENT DOCUMENTS

DE 102010053447 6/2012

*Primary Examiner* — Stacey A Fluhart
(74) *Attorney, Agent, or Firm* — Miller Canfield

(57) ABSTRACT

An improved twin clutch, two-speed disconnect secondary drive unit, which may be configured as a rear drive unit (RDU) for an all wheel drive vehicle is provided. The RDU is driven through an input shaft, which is connected to a vehicle drive source such as a motor, and includes a twin clutch assembly, which is connected to the drive shaft and is selectively actuated to drive left and right main shafts, which drive respective wheels of the vehicle. The RDU further includes a modular a shift assembly mountable to one or both of said main shafts to drive output shafts, wherein each shift assembly is selectively operable between the hi-range and lo-range modes to shift driving operation of the output shafts between hi-speed and lo-speed operation. The shift assembly may be controlled by improved mono-stable or bi-stable actuators.

20 Claims, 20 Drawing Sheets

(51) Int. Cl.
    *B60K 17/16*     (2006.01)
    *B60K 17/354*     (2006.01)
    *B60K 23/04*     (2006.01)
    *B60K 23/08*     (2006.01)
    *F16D 21/06*     (2006.01)
    *F16D 25/061*     (2006.01)
    *F16D 25/10*     (2006.01)
    *F16H 61/30*     (2006.01)
    *F16H 48/19*     (2012.01)
    *F16H 63/04*     (2006.01)
    *F16H 63/30*     (2006.01)
    *F16H 63/34*     (2006.01)
    *F16H 57/02*     (2012.01)

(52) U.S. Cl.
    CPC ............ *B60K 17/354* (2013.01); *B60K 23/04* (2013.01); *B60K 23/08* (2013.01); *F16D 21/06* (2013.01); *F16D 25/061* (2013.01); *F16D 25/10* (2013.01); *F16H 61/30* (2013.01); *F16D 2021/0607* (2013.01); *F16D 2021/0661* (2013.01); *F16D 2021/0692* (2013.01); *F16H 48/19* (2013.01); *F16H 63/04* (2013.01); *F16H 63/3023* (2013.01); *F16H 63/34* (2013.01); *F16H 2057/02052* (2013.01); *F16H 2200/0017* (2013.01); *F16H 2200/0034* (2013.01); *F16H 2200/2005* (2013.01); *F16H 2200/2094* (2013.01)

(58) Field of Classification Search
    CPC .. F16H 2200/2035; F16D 21/06; F16D 13/52; B60K 17/046
    See application file for complete search history.

(56) References Cited

U.S. PATENT DOCUMENTS

| | | | |
|---|---|---|---|
| 2015/0141191 A1* | 5/2015 | Zhang | F16H 3/006 475/329 |
| 2015/0266374 A1 | 9/2015 | Downs et al. | |
| 2019/0249725 A1* | 8/2019 | Kocevar | F16D 25/082 |
| 2019/0376566 A1* | 12/2019 | Tsuzuki | F16D 25/082 |
| 2020/0331342 A1* | 10/2020 | Haka | F16H 37/082 |

* cited by examiner

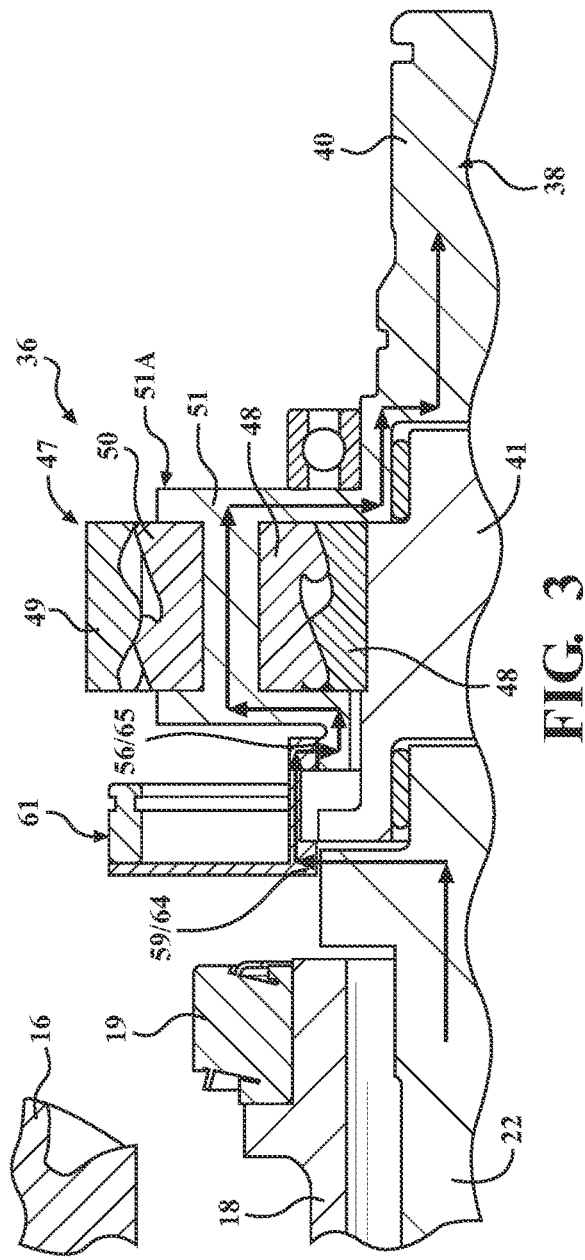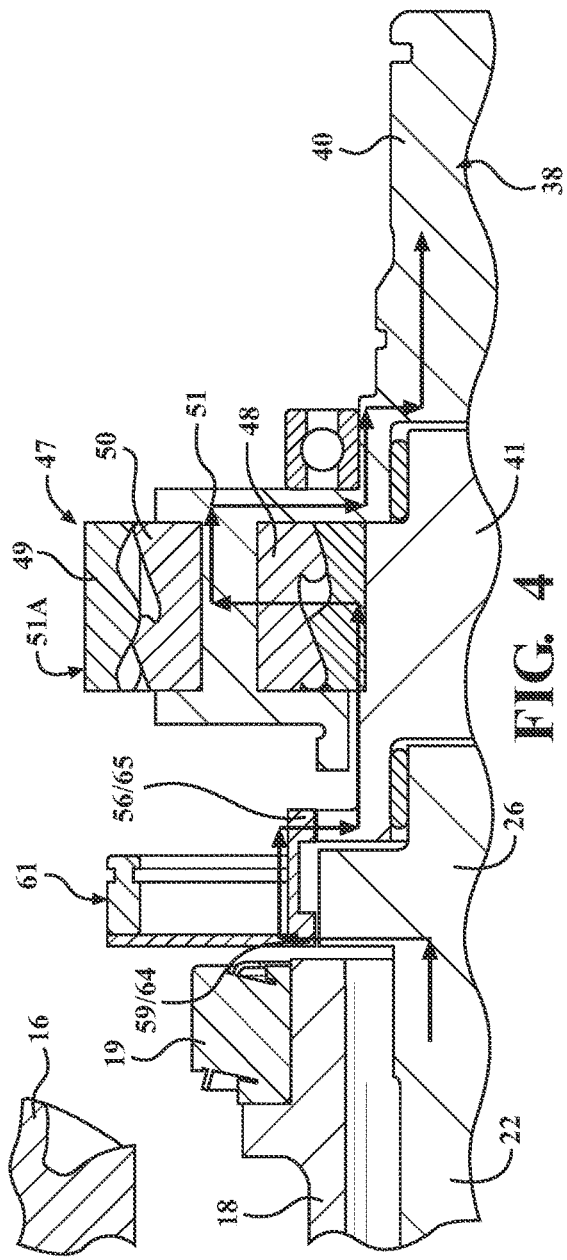

TWIN CLUTCH TWO SPEED DISCONNECT RDU

CROSS REFERENCE TO RELATED APPLICATIONS

This application claims priority of U.S. Provisional Patent Application No. 62/801,384, filed Feb. 5, 2019, the disclosure of which is incorporated herein by reference in its entirety.

BACKGROUND OF THE INVENTION

Field of the Invention

The present invention relates to a vehicle drive unit such as a secondary drive unit, preferably configured as a rear drive unit (RDU) for a vehicle, and more particularly to an RDU having a twin-clutch two-speed configuration, which allows shifting of the RDU between hi-speed and lo-speed operation.

Description of Related Art

A secondary axle on a front or rear wheel drive vehicle may include a disconnecting mechanism, which may include clutches where all wheel drive is an option. On a side mounted twin clutch axle, where independent torque control of left and right wheels is offered, each left and right mounted clutch may have an actuator for activating left side and right side main shafts, which in turn drive the wheels associated therewith. An example of an improved twin clutch system for a secondary axle is disclosed in PCT publication WO 2018/057899, which is owned by the assignee of the present invention and the disclosure of which is incorporated herein by reference in its entirety.

It is an object of the present invention to provide an improved secondary drive unit, preferably configured as a rear drive unit that incorporates an improved drive configuration.

SUMMARY OF THE INVENTION

The invention relates to an improved vehicle drive unit such as a secondary drive unit of a vehicle, preferably configured as a rear drive unit (RDU), which may include a twin clutch configuration for selective driving or disconnection of left hand and right hand main shafts, which in turn operatively drive vehicle wheels associated therewith. While the vehicle drive unit is configured as an RDU, it will be understood that the following disclosure of the vehicle drive unit and the inventive components thereof are not limited to a secondary drive unit or RDU. The inventive drive unit such as the RDU further may include a shift assembly mountable to one or both of said main shafts to intermediately drive output shafts, which connect to and drive the vehicle wheels in either of a hi-range or lo-range mode or condition. More particularly, the shift assembly is selectively operable between the hi-range and lo-range modes to shift driving operation of the output shafts between hi-speed and lo-speed operation. The shift assembly is actuated between the hi-range and lo-range conditions by the vehicle controller.

In one aspect of the invention, the shift assemblies preferably are formed as modular units that may be omitted from an RDU, such that the RDU would then be configured as a one-speed drive unit. In a further aspect, each shift assembly preferably is formed as a modular assembly that can be preassembled together as a sub-assembly and then mounted to the main housing of the RDU. This RDU is thereby optionally provided with the inventive shift assemblies to permit shifting between two speed options, namely the hi-range mode and the lo-range mode.

To effect torque transmission between main shafts of the RDU and output shafts that drive the vehicle wheels by the shift assemblies, each shift assembly includes a planetary gear assembly that engages with the output shaft and defines alternate paths of torque transmission between the main shaft and the output shaft, which transmission paths correspond to and define the hi-range and lo-range modes. To selectively drive the planetary gear assembly, a sun gear and ring gear engage with a set of planet gears supported on a planetary carrier. The planetary carrier includes drive formations thereon, which may be formed as gear teeth. Additional drive formations are provided on the main shaft of the RDU and an intermediate shaft, which carries the sun gear thereon. To switch the shift assembly between the hi-range and lo-range modes, a drive member such as a drive collar is provided which includes first drive formations that engage the main shaft, and second drive formations, which engage either the drive formations on the intermediate shaft or the drive formations on the planetary carrier depending upon the shifted position of the drive collar. An actuator is provided to shift the drive collar between first and second shift positions so as to engage the intermediate shaft or the planetary carrier, which thereby varies the path of torque transmission through the planetary gear assembly depending upon the shift position of the drive collar. This shifting of the torque transmission paths shifts the RDU between the hi range and lo range modes.

In another aspect of the invention, the drive formations are axially spaced apart and formed like gear teeth wherein the drive collar is axially shiftable by an actuator. Generally, the drive teeth may be located at radial distances from the central axis extending through the main shaft, intermediate shaft and output shaft that may be made the same or may be different to vary torque transmission characteristics through the shift assembly.

In another aspect of the invention, the actuator may be formed as a hydraulic actuator and may be configured so as to be bi-stable or mono-stable. In one embodiment of a bi-stable actuator, the actuator may incorporate a hydraulic piston, which is selectively pressurized to shift between the hi-range or lo-range modes. Once shifted, the piston will remain in the shifted mode, such as the hi-range mode or lo-range mode, even when depressurized, and will remain in this mode until again pressurized and shifted to the other mode.

In a mono-stable actuator, the actuator may be formed as a hydraulic actuator having a hydraulic piston, which is selectively pressurized to shift between the hi-range and lo-range modes. Once the piston is pressurized and shifted, the piston will remain in the shifted mode so long as it is pressurized. If depressurized, the piston may automatically return to the other shift position such as by a spring or other biasing member. As such, this actuator is considered mono-stable.

In another aspect of the invention, the actuator may be formed as a bi-stable hydraulic actuator having a hydraulic piston, which is selectively pressurized to shift between the hi-range and lo-range modes. As the piston is pressurized and shifted from a first shift position to a second shift position, the piston may remain in the second shift position so long as it is pressurized. If depressurized, the piston may automatically return to the first shift position such as by a spring or other biasing member. However, a releasable lockout mechanism may be provided, which releasably locks the piston in the second shift position even when depressurized so that the actuator is bi-stable and the piston remains in the first or second position when depressurized. To shift back to the first shift position, the lockout mechanism would need to release the piston under the control of the vehicle controller. In other words, the actuator is bi-stable so as to be positively restrained in both of the hi-range and lo-range states even in the absence of power and hydraulic fluid pressure.

With the use of mono-stable and bi-stable hydraulic actuators in the shift assemblies of the inventive RDU units, different embodiments of hydraulic fluid control systems or circuits may be employed. Generally, the preferred control system includes a main control circuit for controlling clutch systems or other components of the main RDU, and includes a secondary shift control circuit to shift between the hi-range and lo-range modes, wherein the shift control circuit may vary depending upon the shift assembly embodiment being employed. In the single-speed RDU, the shift control circuit would be omitted. However, in a two-speed RDU, the shift control circuit would also be provided to control shifting of the shift assemblies disclosed herein.

For mono-stable shifting, a 3/2 (3 port, 2 position) on/off valve may be provided that is normally closed but is operable to selectively pressurize and shift the mono-stable actuator. When depressurized, the actuator may automatically return to the original shift state, such as by spring biasing. This same control circuit might also be used with the bi-stable actuator incorporating the lockout device. For a bi-stable actuator using a reversible piston, an alternate shift control circuit may be provided in a single-valve or double-valve configuration. In the double valve configuration, the low and high sides of the hydraulic actuators are controlled by a respective 3/2 valve. As such, one valve controls shifting of each piston to the lo-range mode and the other valve controls shifting of each piston to the hi-range mode. Alternatively, a single-valve configuration may be provided wherein both hydraulic actuators may be controlled by a single 4/2 valve.

Other objects and purposes of the invention, and variations thereof, will be apparent upon reading the following specification and inspecting the accompanying drawings.

BRIEF DESCRIPTION OF THE DRAWINGS

Advantages of the present invention will be readily appreciated as the same becomes better understood by reference to the following detailed description when considered in connection with the accompanying drawings wherein:

FIG. 3 is a cross-sectional side view of the shift assembly of the RDU engaged in the hi-range operating mode;

FIG. 4 is a cross-sectional side view of the shift assembly of the RDU engaged in the lo-range operating mode;

Figure 1:
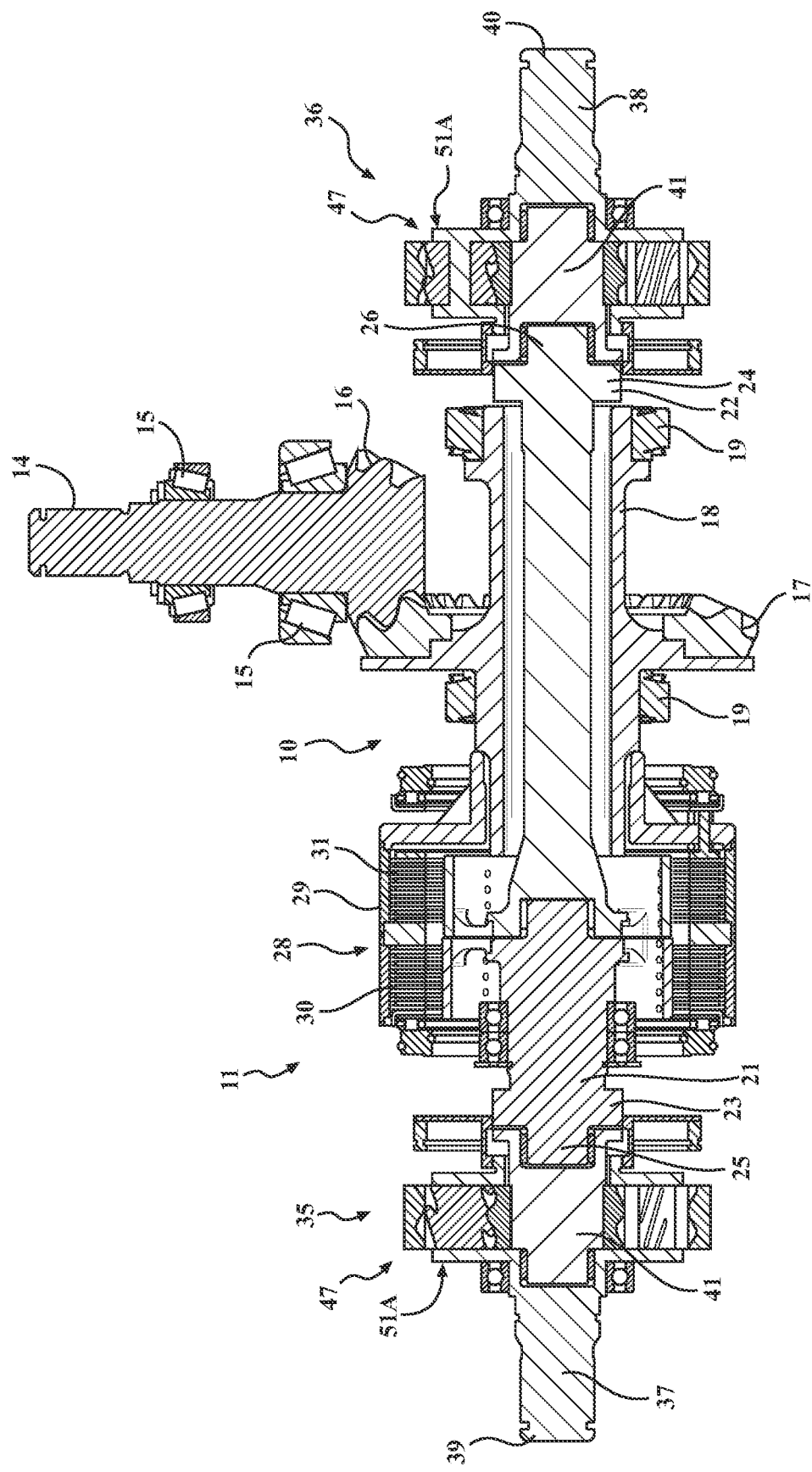
FIG. 1 is a cross-sectional side view of a secondary drive unit, preferably a rear drive unit (RDU) according to a first embodiment of the invention, which forms a rear or other secondary axle of a vehicle.

Certain terminology will be used in the following description for convenience and reference only, and will not be limiting. For example, the words "upwardly", "downwardly", "rightwardly" and "leftwardly" will refer to directions in the drawings to which reference is made. The words "inwardly" and "outwardly" will refer to directions toward and away from, respectively, the geometric center of the arrangement and designated parts thereof. Said terminology will include the words specifically mentioned, derivatives thereof, and words of similar import.

DETAILED DESCRIPTION OF THE PREFERRED EMBODIMENTS

Referring to the figures, wherein like numerals indicate like or corresponding parts throughout the several views, a secondary drive unit according to a preferred first embodiment of the invention is shown at 10 in FIGS. 1-4. Generally, the secondary drive unit 10 is configured for a secondary axle 11 on a front or rear wheel drive vehicle, which also supports all wheel drive. Preferably, the secondary drive unit is configured as a rear drive unit 10 (RDU) for the rear axle of the vehicle. While described and illustrated herein with reference to the rear axle of a front wheel drive vehicle, it will be appreciated that the rear drive unit 10 and the other embodiments disclosed herein and components thereof may be used for any secondary axle.

Generally, the RDU 10 forms part of a vehicle drivetrain assembly, wherein the vehicle drivetrain assembly transfers torque to a first or main set of one or more wheels and a secondary set of one or more wheels of a vehicle. Commonly, the main set of wheels and secondary set of wheels are the front and rear wheels of the vehicle. The drivetrain assembly includes a main or front driveline and a secondary or rear driveline, which respectively drive the front and rear wheels. The front driveline may include, among other components, an engine, a transmission and a power take off unit (PTU), wherein the PTU transmits torque through a drive shaft to drive the secondary drive unit and specifically the RDU 10. A vehicle controller communicates with the components in the front driveline and rear driveline including components of the RDU 10 to selectively control operation of the RDU 10.

More particularly, FIG. 1 is a cross-sectional side view of the RDU 10, which includes an input shaft 14 that is drivingly connected with the drive shaft of the vehicle and in effect forms part of the vehicle drivetrain. The drive end of the input shaft 14 is rotatably supported by bearings 15, and includes a drive gear or pinion gear 16, which meshes with and is drivingly engaged with a driven ring gear 17 that is rotatably supported by the RDU housing. As such, drive torque from the vehicle motor is transmitted to the RDU 10 by the engagement of the vehicle drive shaft to the input shaft 14 of the RDU 10, wherein the drive torque in turn is transmitted to the ring gear 17 through the interlocked engagement of the pinion gear 16 and the ring gear 17.

The ring gear 17 is connected to and rotatably drives a primary shaft 18 that is rotatably supported by the housing of the RDU 10 with bearings 19. The primary shaft 18 preferably includes a central bore in which left and right main shafts 21 and 22 are rotatably supported in coaxial relation. The free outer ends of the main shafts 21 and 22 include connector hubs 23 and 24 that include shaft connectors 25 and 26 that are configured for driving connection to the secondary drive wheels, and preferably, the rear vehicle wheels as will be described further herein. The terms left and right are used herein to generally depict the relative positions of the main shafts 21 and 22 and other components relative to the illustration thereof in the figures, and may correspond to the left and rear wheels of the vehicle. It will be understood that the terms left and right are relative terms and do not limit the present scope of the invention. Where the terms left and right are used, the terms left and right could be used interchangeably with the terms first and second or other like terms.

The primary shaft 18 is drivingly engagable with the main shafts 21 and 22 by a twin clutch assembly 28, which includes a common clutch housing 29, a left clutch 30 and a right clutch 31. The clutch housing 29 is supported on the primary shaft 18. In this embodiment, the left main shaft 21 is piloted and supported by the right main shaft 22, although this may be reversed. Each clutch 30 and 31 operatively controls torque of the respective left and right main shafts 21 and 22, and further includes respective sets of left and right clutch plates, sets of left and right friction disks, and respective actuators for activating the clutches 30 and 31 and thereby rotating the main shafts 21 and 22 and engaging AWD in the vehicle. The clutches 30 and 31 extend between the clutch housing and the ends of the main shafts 21 and 22 wherein the clutches 30 and 31 are each actuatable by hydraulic actuators to selectively transfer torque from the primary shaft 18 to the main shafts 21 and 22 through the clutch plates or else disengage torque transfer when deactivated. The hydraulic actuators are not illustrated herein, but are discussed in more detail relative to FIG. 24 below. When the clutch assembly 28 is actuated to provide AWD, the right main shaft 22 transfers torque to the right rear wheel and the left main shaft 21 transfers torque to the left rear wheel. Depending on the amount of slip between the left and right clutch plates provided in the left and right clutches 30 and 31, differential motion may be carried out through the left and right main shafts 21 and 22.

In two wheel drive (2WD) mode, the clutches 30 and 31 are deactivated or disconnected to cause a disconnect between the ring gear 17/primary shaft 18 and the left and right main shafts 21 and 22 so that the wheels are no longer driven by the main shafts 21 and 22. In order to change the state back to a connected AWD drive mode, the left and right clutches 30 and 31 are activated or engaged at the same time or in serial fashion such that driving rotation of the primary shaft 18 then drives the main shafts 21 and 22 to drive the wheels. As such, the RDU 10 preferably incorporates this disconnected twin-clutch configuration.

Further, the improved RDU 10 may be provided in a two-speed configuration as shown in FIGS. 1-4. In the two-speed configuration for the RDU 10, each end of the RDU 10 may include a shift assembly 35 or 36, wherein each shift assembly 35 and 36 is intermediately connected to the vehicle wheels to govern shifting of the speed output of the RDU 10 between hi-range and lo-range conditions (or modes) as described further herein relative to FIGS. 2-4. In other words, the magnitude of the input speed of the input shaft 14 may rotate at a single variable speed but the resulting magnitude of the output speed of the wheels may be shifted between hi-range and lo-range modes, wherein the wheels may rotate at two different hi or lo speeds. Each shift assembly 35 and 36 includes a respective output shaft 37 and 38 that includes a connector hub 39/40 at the outer free end thereof. The connector hubs 39 and 40 in turn are engagable with the remaining components of left and right wheel assemblies to transmit the driving torque to the wheels.

In more detail, the shift assemblies 35 and 36 are located intermediate or between the main shafts 21/22 and the wheel assemblies to define a twin-clutch two-speed configuration for the RDU 10. However, the shift assemblies 35 and 36 preferably are formed as modular units that may be omitted from RDU 10, such that the RDU 10 would then be configured as a one-speed drive unit. In a one speed configuration, the shift assemblies 35 and 36 are omitted, and the left and right main shafts 21 and 22 would have alternate output shafts connected directly between the main shaft connector hubs 23 and 24 and the wheel assemblies. As such, the wheels would rotate at a speed relating to the rotary speed of the drive shaft 14 and pinion gear 16. However, this configuration could optionally be provided with the shift assemblies 35 and 36 to permit shifting between two speed options, namely the hi-range mode and the lo-range mode discussed further below. As such, the modular shift assemblies 35 and 36 could be mounted on the RDU 10 in engagement with the main shafts 21 and 22 to provide the two-speed option.

Figure 2:
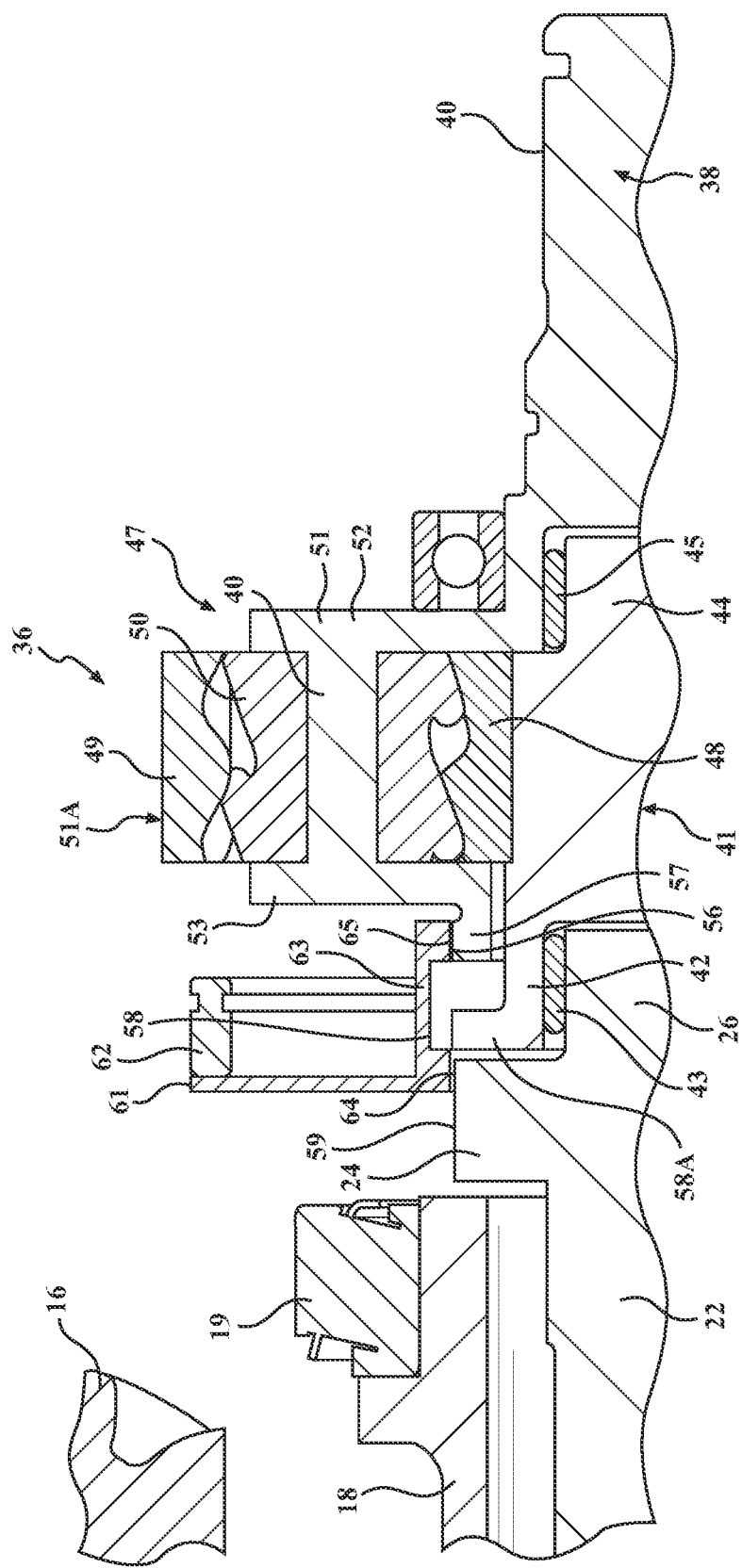
FIG. 2 is an enlarged cross-sectional side view of the inventive RDU showing a right hand main shaft of the RDU including a two-speed shift assembly to shift the RDU between hi-range and lo-range operating modes.

Referring in more detail to the two-speed configuration, FIG. 2 is an enlarged cross-sectional side view of the inventive RDU 10 showing the right hand main shaft 22 of the RDU 10 operatively connected to the two-speed shift assembly 36, which permits shifting of the RDU 10 between hi-range and lo-range operating modes. It will be understood that the left-side shift assembly 35 includes the same component parts as the shift assembly 36 in an opposite orientation, such that specific discussion of the left-side shift assembly 35 is not required herein for an understanding of the present invention. In more detail, the shift assembly 36 is interconnected between the main shaft 22 and output shaft 38, preferably by an intermediate shaft 41, which is concentric with and selectively engaged between the main shaft 22 and the output shaft 38. The intermediate shaft 41 includes an inboard hub 42 that is rotatably supported on the main shaft connector hub 26 and rotatably supported by a bearing 43. The intermediate shaft 41 also includes an outboard hub 44 that rotatably supports the output shaft 38 by a bearing 45.

To effect torque transmission between the main shaft 22 and output shaft 38, a planetary gear assembly 47 is provided, which engages with the output shaft 38 and defines alternate paths of torque transmission between the main shaft 22 and the output shaft 38, which correspond to the hi-range and lo-range modes. In more detail, the planetary gear assembly 47 includes a sun gear 48, which is supported on the outer circumference of the intermediate shaft 41, and includes a ring gear 49, which is concentric to the sun gear 48 in radially spaced, opposing relation. At least one and preferably a set of planet gears 50 are meshed radially with the sun gear 48 and ring gear 49. The planet gears 50 are mounted to and supported by a planetary carrier 51 to form a planetary carrier assembly 51A that is supported on the output shaft 38 and rotates therewith. The planetary carrier 51 has an outboard carrier section 52, an inboard carrier section 53, and circumferentially-spaced support shafts 54 for rotatably supporting the planet gears 50. The outboard carrier section 52 is supported on the inboard end of the output shaft 38 either integral therewith or as a separate component, such that rotation of the planetary carrier 51 rotates the output shaft 38.

To selectively drive the planetary carrier 51, the inboard carrier section 53 includes drive formations preferably formed as drive teeth 56. The drive teeth 56 preferably are formed about the circumference of a drive flange 57 and face radially outwardly. To switch the shift assembly 36 between the hi-range and lo-range modes, the intermediate shaft 41 also includes drive teeth 58 on an end flange 58A, which face radially outwardly. The main shaft connector hub 26 includes similar drive formations formed as drive teeth 59 facing radially outwardly. The drive teeth 56, 58 and 59 are axially spaced apart and formed like gear teeth but other configurations of drive formations might be provided. Generally, the drive teeth 56, 58 and 59 are located at or about the same radial distance from the central axis extending through the main shaft 22, intermediate shaft 41 and output shaft 38 although the distances may vary to vary torque transmission characteristics.

Further, the shift assembly 36 includes a shift member unit 61, which may include annular shift member formed as a shift collar 63 that has an outer actuator arm 62. The shift collar 63 is displaceable axially by a suitable actuator such as a hydraulic actuator that is electrically controlled by a vehicle controller. As seen in FIG. 2, the shift collar 63 includes a main body that is formed with axially-spaced drive formations 64 and 65, which are preferably formed as drive teeth that face radially inwardly and selectively mesh with the drive teeth 56, 58 and/or 59. FIGS. 3 and 4 show the shift collar 63 shifted axially between two axially spaced positions corresponding to the hi-range and lo-range modes of the shift assembly 36. The inboard drive teeth 64 on the shift collar 63 mate with and are axially slidable along the drive teeth 59 so as to remain engaged therewith in both of the hi-range and lo-range modes. The outboard drive teeth 65 on the shift collar 63 are configured so that they may mate with the drive teeth 56 of the planetary carrier 51 in the hi-range mode of FIG. 3, or alternatively mate with the drive teeth 58 of the intermediate shaft 41 in the lo-range mode of FIG. 4.

In the hi-range mode of FIG. 3, the main shaft 22 would transmit torque through the shift collar 63 and the meshed drive teeth 56/65 to the planetary carrier 50, which in turn rotates the inner end of the planetary carrier 50 to thereby rotate the planet gears 50 and drive the output shaft 38. As such, this torque transmission rotates the output shaft 38. The torque transmission is shown by the reference arrows in this operative condition or mode, wherein the torque transfers through the shift collar 63 to the planetary carrier 51 to the output shaft 38. The rotation speed and torque is governed by the transmission of torque to and rotation of the planetary carrier 51, which results in a higher speed and lower torque transfer in comparison to the lo-range mode.

In the lo-range mode of FIG. 4, the main shaft 22 would transmit torque to the intermediate shaft 41 through the meshed drive teeth 58/65, which in turn rotates the sun gear 48 to rotate the planet gears 50 and planetary carrier 51. As such, this torque transfer rotates the output shaft 38. The torque transmission is shown by the reference arrows in this operative condition or mode, wherein the torque transfers from the main shaft 22 to the shift collar 61 to the intermediate shaft 41 and to the planet gears 50 through the sun gear 48 to thereby rotate the output shaft 38. The rotation speed and torque is governed by the meshed engagement of the planet gears 50 with the sun gear 48, which results in lower speed and higher torque transfer in comparison to the hi-range mode In the RDU configuration of FIGS. 1-4, a disconnecting twin-clutch, two-speed RDU 10 is provided as a secondary drive unit. Primarily, this unit is provided for a rear axle but may be used on other secondary axles depending upon the configuration of the drivetrain provided in the vehicle. As noted, the shift assemblies 35 and 36 may optionally be provided for two-speed operation of the RDU since they are modular units but may be omitted so that the RDU 10 operates as a single-speed RDU. The clutches 30 and 31 and the range shift provided by the shift assemblies 35 and 36 preferably are operated by electro-hydraulic actuators or actuation, which is controllable by the vehicle controller. The clutches 30 and 31 also provide a differential lock feature up to the lock capacity. Further, this inventive configuration provides independent torque control of wheel outputs for traction and dynamic handling.

Figure 5:
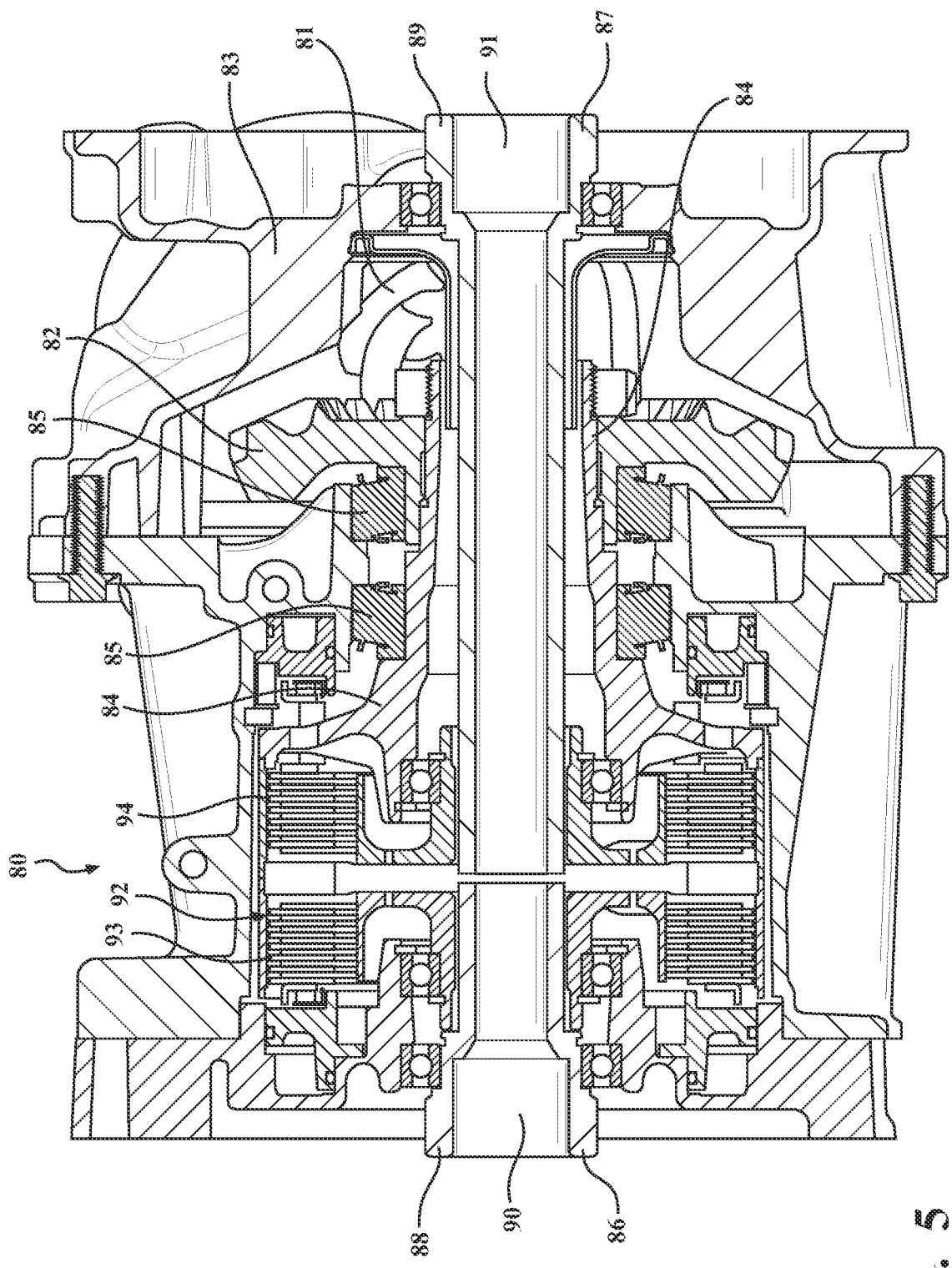
FIG. 5 is a cross-sectional view of a second embodiment of an RDU in a twin-clutch single-speed configuration.

Referring to FIG. 5, a second embodiment of a secondary drive unit is preferably shown as an RDU 80. the RDU is configured in a twin-clutch single-speed configuration, although it is reconfigurable to a two-speed configuration as described below. Similar to the embodiment of FIG. 1, the RDU 80 includes an input shaft that is drivingly connected with the drive shaft of the vehicle and in effect forms part of the vehicle drivetrain. The drive end of the input shaft includes a drive gear or pinion gear 81, which meshes with and is drivingly engaged with a driven ring gear 82 that is rotatably supported by the RDU housing 83. As such, drive torque from the vehicle motor is transmitted to the RDU 80 by the engagement of the vehicle drive shaft to the input shaft 81, wherein the drive torque in turn is transmitted to the ring gear 82.

The ring gear 82 is connected to and rotatably drives a primary shaft 84 that is rotatably supported in the RDU 80 by bearings 85, which are supported on the housing 83. The primary shaft 84 preferably includes a central bore in which left and right main shafts 86 and 87 are rotatably supported in coaxial relation. The main shafts 86 and 87 include connector hubs 88 and 89 at the outer free ends thereof that include shaft connectors 90 and 91 that are configured for driving connection to the secondary drive wheels, and preferably, the rear vehicle wheels as will be described further herein.

The primary shaft 84 drivingly engages the main shafts 86 and 87 by a twin clutch assembly 92, which includes a left clutch 93 and a right clutch 94. Each clutch 93 and 94 includes respective sets of left and right clutch plates, sets of left and right friction disks, and respective actuators for activating the clutches 93 and 94. The clutches 93 and 94 are each actuatable by hydraulic actuators to selectively transfer torque from the primary shaft 84 to the main shafts 86 and 87 through the clutch plates or else disengage torque transfer when deactivated. When the clutches 93 and 94 of the clutch assembly 92 are actuated, the right main shaft 87 transfers torque to the right rear wheel and the left main shaft 86 transfers torque to the left rear wheel. Here again, the terms left and right are relative terms. Depending upon the amount of slip between the left and right clutch plates, differential motion is carried out through the right and left main shafts 87 and 86.

In two-wheel drive (2WD) mode, the clutches 93 and 94 are deactivated or disconnected. In order to change back to a connected AWD drive mode, the left and right clutches 93 and 94 are activated or engaged such that driving rotation of the primary shaft 84 then drives the main shafts 86 and 87 to drive the wheels. As such, the RDU 80 preferably incorporates this disconnected twin-clutch configuration.

Figure 6:
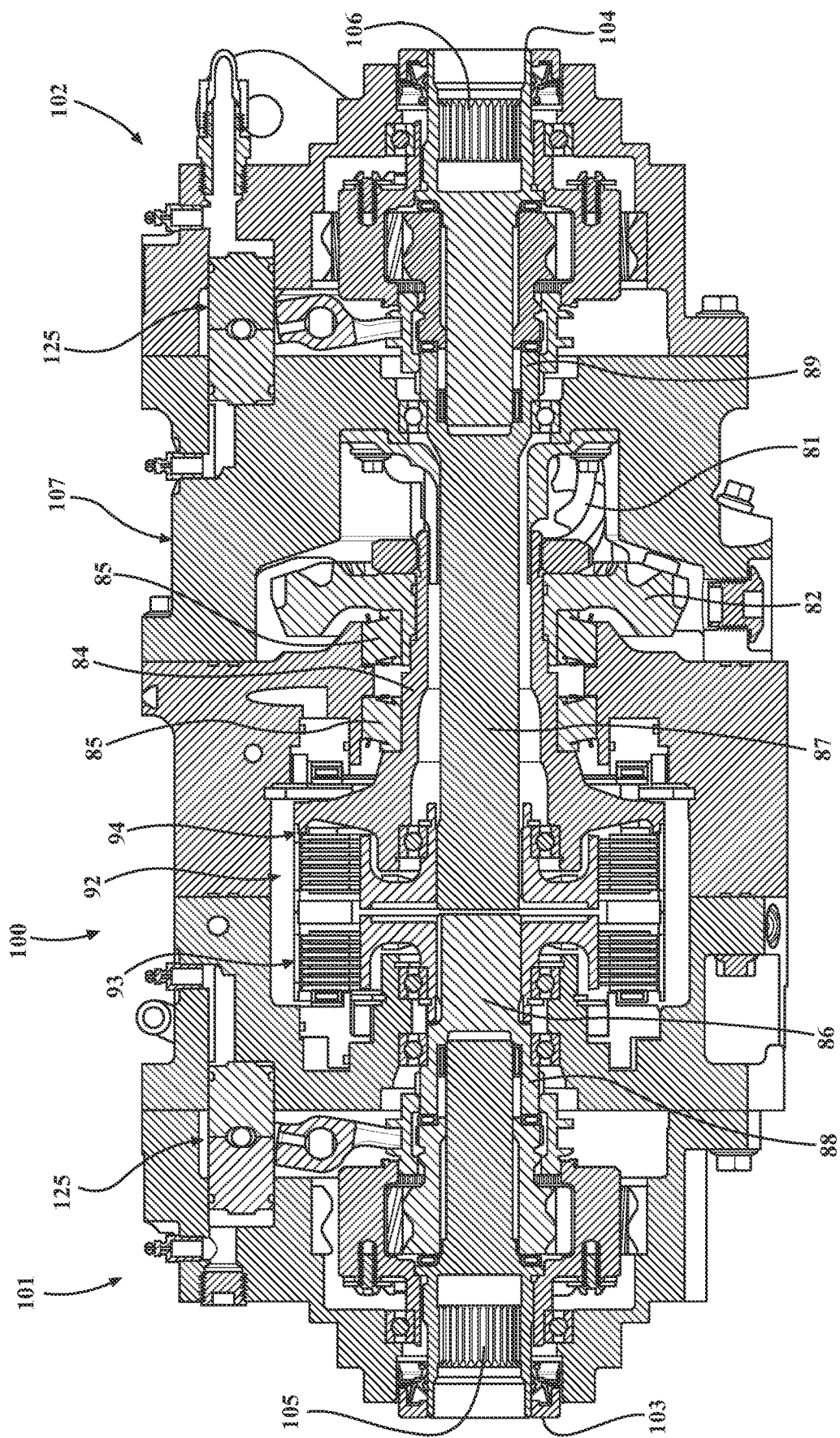
FIG. 6 is a cross-sectional view of a modified second embodiment of an RDU with modular shift assemblies mounted on the opposite ends thereof to configure the RDU as a twin-clutch two-speed configuration shown in a hi-range mode.

Next as shown in FIG. 6, the improved RDU preferably may be provided in a two-speed configuration identified by reference numeral 100, which includes a number of common component parts from the single speed RDU 80. In a two-speed configuration for the RDU 100, each end of the RDU 100 can include a shift assembly 101 and 102, wherein each shift assembly 101 and 102 is intermediately connected to the vehicle wheels to govern shifting of the speed output of the RDU 100 between hi-range and lo-range conditions (or modes) as described further herein relative to FIGS. 7-11. Each shift assembly 101 and 102 includes a respective output shaft 103 and 104 that includes a connector hub 105 and 106 at the outer free end thereof. The connector hubs 105 and 106 include toothed bores, which in turn are engagable with the remaining components of the left and right wheel assemblies to transmit the driving torque to the wheels.

In more detail, the two speed RDU 100 includes parts common to the single speed RDU 80, wherein the RDU 100 includes an input shaft that is drivingly connected with the drive shaft of the vehicle and in effect forms part of the vehicle drivetrain. Common reference numerals are used for common parts. The drive end of the input shaft includes a drive gear or pinion gear 81, which meshes with and is drivingly engaged with the driven ring gear 82 that is rotatably supported by the RDU housing 107, which is modified in comparison to the housing 83 of FIG. 6. The housing 107A is configured to accommodate mounting of the shift assemblies 101 and 102 thereto as well as other actuator components. However, other internal drive components may remain the same so that the RDU 100 essentially is modular and may optionally include the shift assemblies 101 and 102 with minimal modifications to the system components used in the RDU 80.

In the two-speed configuration, the drive torque from the vehicle motor is still transmitted by the engagement of the vehicle drive shaft to the input shaft and pinion gear 81, wherein the drive torque in turn is transmitted to the ring gear 82. The ring gear 82 is connected to and rotatably drives a primary shaft 84 that is rotatably supported in the RDU housing 107 by bearings 85, which are supported on the housing 107. The primary shaft 84 preferably includes a central bore in which left and right main shafts 86 and 87 are rotatably supported in coaxial relation. The main shafts 86 and 87 include connector hubs 88 and 89 at the outer free ends thereof. Similar to FIGS. 1-4, the connector hubs 88 and 89 are configured for driving connection to the secondary drive wheels, and preferably, the rear vehicle wheels as will be described further herein by the shift assemblies 101 and 102 disposed intermediately therebetween.

The primary shaft 84 drivingly engages the main shafts 86 and 87 by the twin clutch assembly 92, which includes the left clutch 93 and the right clutch 94. As described above, the clutches 93 and 94 are each actuatable by hydraulic actuators (FIG. 24) to selectively transfer torque from the primary shaft 84 to the main shafts 86 and 87 through the clutch plates or else disengage torque transfer when deactivated. When the clutch assembly 92 is actuated, the right main shaft 87 transfers torque to the right rear wheel and the left main shaft 86 transfers torque to the left rear wheel. Here again, depending on the amount of slip between the left and right clutch plates, differential motion is carried out through right and left main shafts 87 and 86.

In two-wheel drive (2WD) mode, the clutches 93 and 94 are deactivated or disconnected. In order to change back to a connected AWD drive mode, the left and right clutches 93 and 94 are activated or engaged such that driving rotation of the primary shaft 84 then drives the main shafts 86 and 87 to drive the wheels. As such, the RDU 100 preferably incorporates this disconnected twin-clutch configuration. To provide two-speed capability, the afore-mentioned shift assemblies 101 and 102 are mounted to the housing 107 and operatively connected to the connector hubs 88 and 89 on the main shafts 86 and 87.

Figure 7:
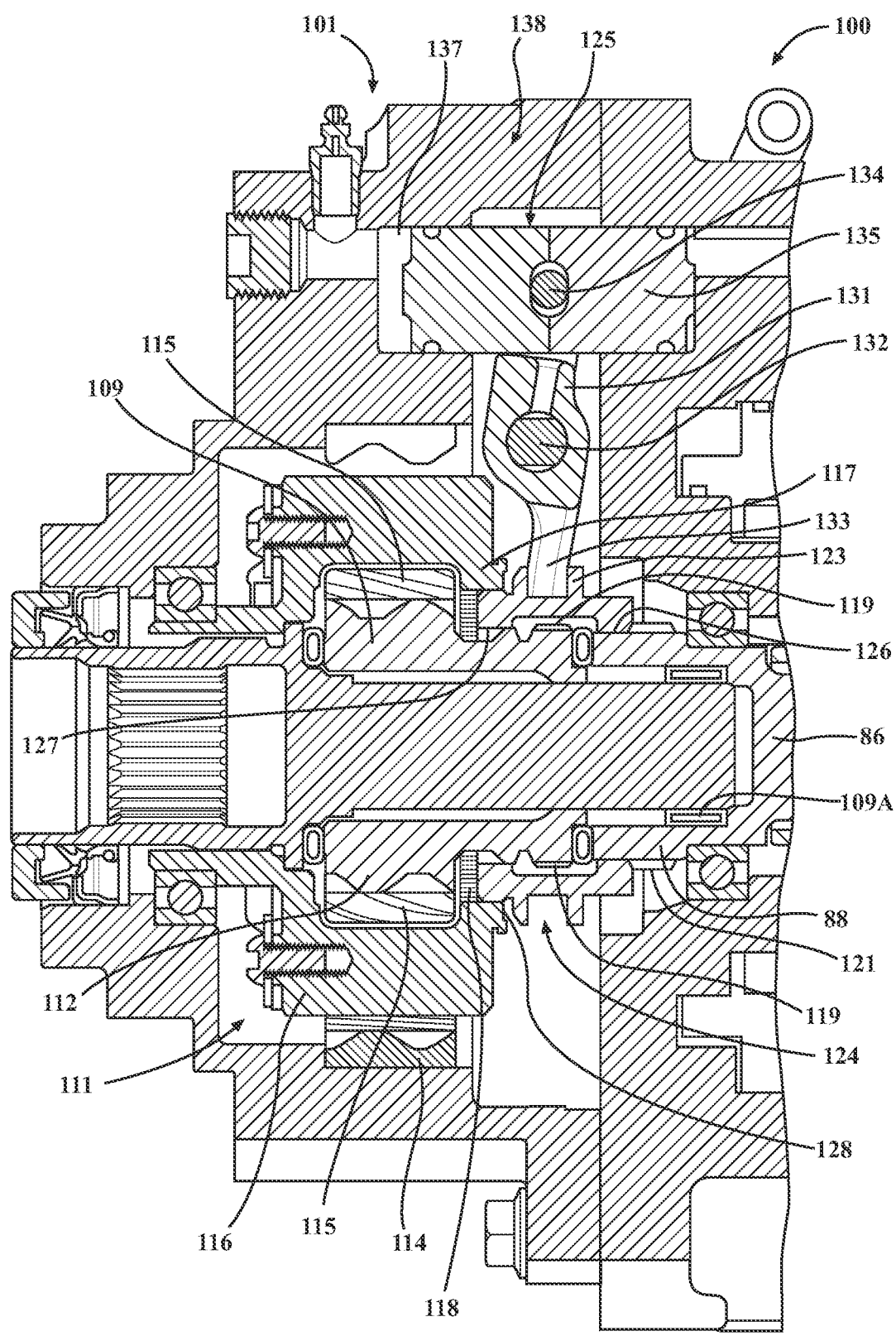
FIG. 7 is an enlarged cross-sectional view of FIG. 6 showing the left side shift assembly.
Figure 8:
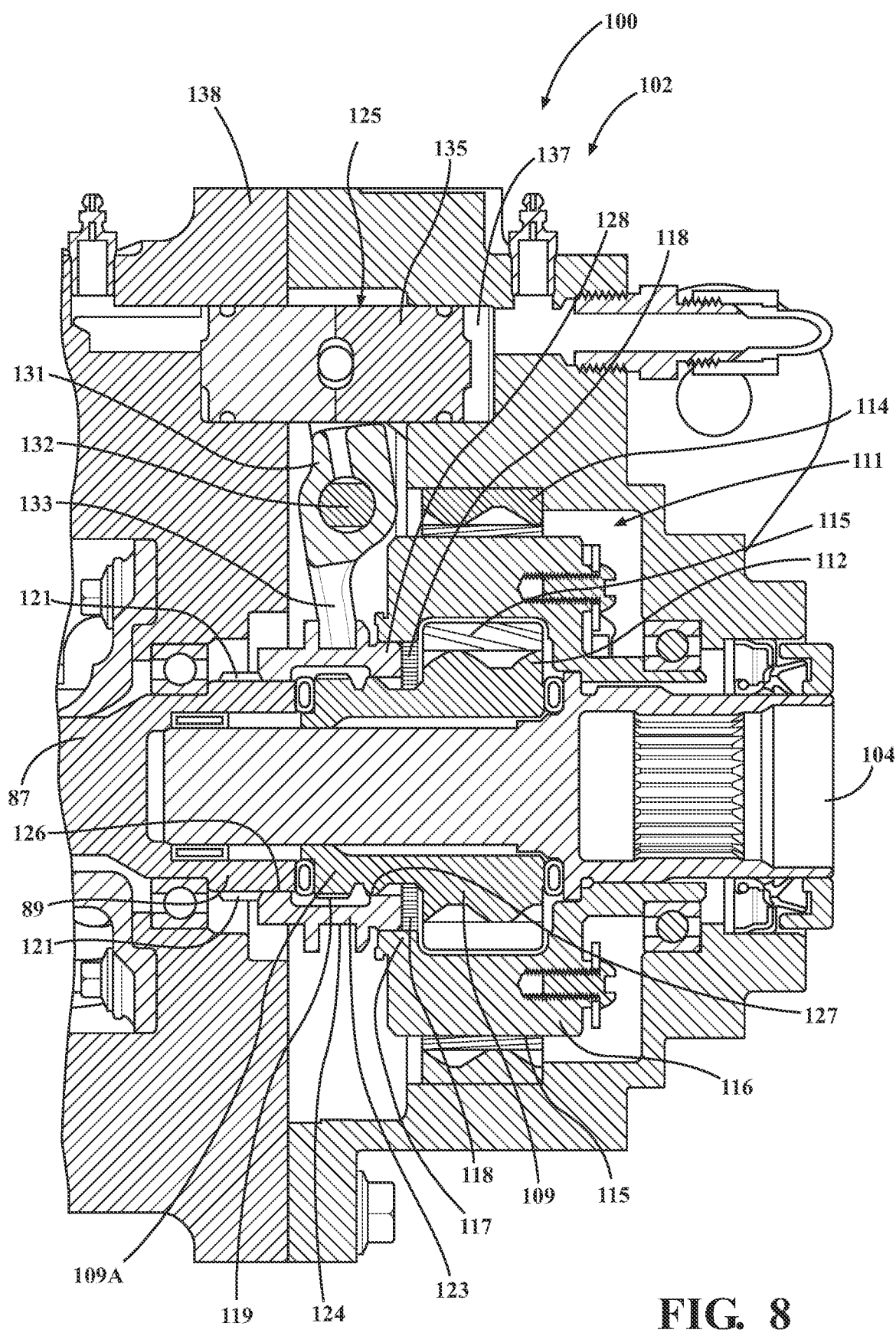
FIG. 8 is an enlarged cross-sectional view of FIG. 6 showing the right side shift assembly.

More particularly as to the shift assemblies 101 and 102, the modular shift assemblies 101 and 102 are mounted in place to configure the RDU 100 as a twin-clutch two-speed configuration, which is shown in a hi-range mode in FIGS. 6-8. FIG. 7 is an enlarged cross-sectional view of FIG. 6 showing the left side shift assembly 101, and FIG. 8 is an enlarged cross-sectional view of FIG. 6 showing the right side shift assembly 102.

Referring to FIG. 7, the inventive RDU 100 is shown with the left hand main shaft 86 operatively connected to the two-speed shift assembly 101, which permits shifting of the RDU 100 between hi-range and lo-range operating conditions. FIG. 8 shows the right-side shift assembly 102, which includes common component parts as the shift assembly 101 in an opposite orientation connected to the right hand main shaft 87. The following discussion of the left-side shift assembly 101 (FIG. 7) and right-side shift assembly 102 (FIG. 8) use common reference numerals for common parts.

In more detail as to FIGS. 7 and 8, each shift assembly 101/102 is interconnected between the respective main shaft 86/87 and output shaft 103/104. In this second embodiment, the inboard end of the output shaft 103/104 connects directly to and is rotatably supported by the main shaft connector hub 88/89. An intermediate shaft 109 is provided on an inboard end of the output shaft 103/104, wherein the intermediate shaft 109 surrounds the inboard end of the output shaft 103/104 and is rotatably supported thereon.

To effect torque transmission between the main shaft 86/87 and output shaft 103/104, each shift assembly 101/102 includes a planetary gear assembly 111, which engages with the output shaft 103/104 and defines alternate paths of torque transmission between the main shaft 86/87 and the respective output shaft 103/104. In more detail, the planetary gear assembly 111 includes a sun gear 112. In this embodiment, the sun gear 112 is preferably formed integrally with the intermediate shaft 109 so as to project radially from the outer circumference of the intermediate shaft 109.

The planetary gear assembly 111 further includes a ring gear 114, which is concentric to the sun gear 112 in radially spaced, opposing relation. At least one and preferably a set of planet gears 115 mesh radially between the sun gear 112 and ring gear 114. The planet gears 115 are mounted to and supported by a planetary carrier 116 to form a rotatable planetary carrier assembly that is supported on the respective output shaft 103/104 and rotates therewith. The planetary carrier 116 rotatably supports the planet gears 115 in circumferentially-spaced relation. The planetary carrier 116 is supported on the respective output shaft 103/104 either integral therewith or as a separate component as seen in FIGS. 7 and 8, such that rotation of the planetary carrier 116 rotates the respective output shaft 103/104. To selectively drive the planetary carrier 116, an inboard section 117 of the planetary carrier 116 includes drive formations preferably formed as drive teeth 118. The drive teeth 118 preferably face radially inwardly from an edge of an opening formed in the planetary carrier 116.

To switch the shift assembly 101/102 between the hi-range and lo-range modes, the intermediate shaft 109 also includes drive formations 119 that may be configured as drive teeth 119 on an end flange 109A, which face radially outwardly. The main shaft connector hub 88/89 includes similar drive formations that may be configured as drive teeth 121 facing radially outwardly. The drive teeth 118, 119 and 121 are axially spaced apart and formed like gear teeth but other configurations of drive formations might be provided. Generally, the drive teeth 119 and 121 are located at or about the same radial distance from the central axis extending through the main shaft 86/87 and output shaft 103/104 while the drive teeth 118 are located at a larger radial distance. These radial distances may be varied to vary the torque transmission characteristics.

Further, each shift assembly 101/102 includes a shift member 123, which may be an annular shift collar 123 that has an outer pocket 124 that is drivingly connected to an actuator 125. The outer pocket 124 may be formed as an annular channel as shown. The shift collar 123 is displaceable axially by the actuator 125 such as a hydraulic actuator that is electrically controlled as described below relative to FIGS. 12 and 13. The shift collar 123 includes a main body that is formed with axially-spaced drive formations 126 and 127, which face radially inwardly, and with additional drive formations 128, which face radially outwardly. The drive formations 126, 127 and 128 are preferably formed as drive teeth, which mesh with the above-described drive teeth 121, 119 and 118 respectively. These drive teeth 118, 119, 121, 126, 127 and 128 preferably mesh radially but permit axially sliding therebetween during shifting.

Generally, FIGS. 6-8 and 9-11 show the shift collar 123 shifted axially between two axially spaced positions corresponding to the hi-range and lo-range modes of the shift assembly 101/102. The inboard drive teeth 126 on the shift collar 123 mate with and are axially slidable along the drive teeth 121 of the main shaft 86/87 so as to remain engaged therewith in both of the hi-range and lo-range modes. The outboard, outward-facing drive teeth 128 on the drive collar 123 are configured so that they may mate with the drive teeth 118 of the planetary carrier 116 in the hi-range mode of FIGS. 7 and 8. Alternatively as described relative to FIGS. 9-11, the outboard, inward facing drive teeth 127 mate with the drive teeth 119 of the intermediate shaft 109 in the lo-range mode.

In the hi-range mode of FIGS. 7 and 8, the main shaft 86/87 would transmit torque through the meshed teeth 121/126 to the drive collar 123 and through meshed drive teeth 128/118 to the planetary carrier 116, which in turn rotates the planetary carrier 116 to thereby drive the output shaft 103/104. As such, this torque transmission rotates the output shaft 103/104. The rotation speed and torque is governed by the rotation of the planetary carrier 116, which results in a higher speed and lower torque transfer in comparison to the lo-range mode.

Figure 9:
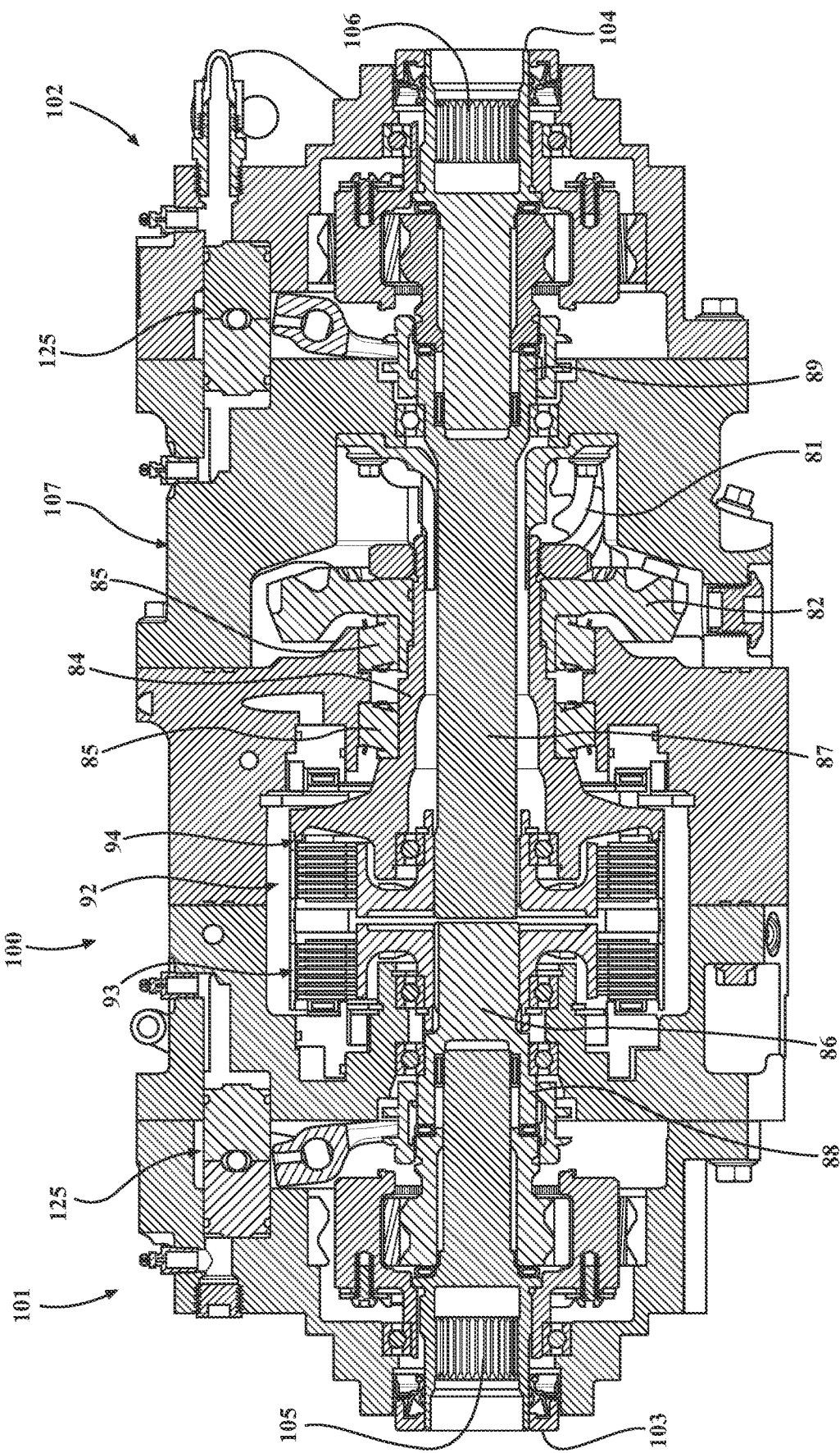
FIG. 9 is a cross-sectional view of the modified second embodiment with modular shift assemblies actuated to a lo-range mode.
Figure 10:
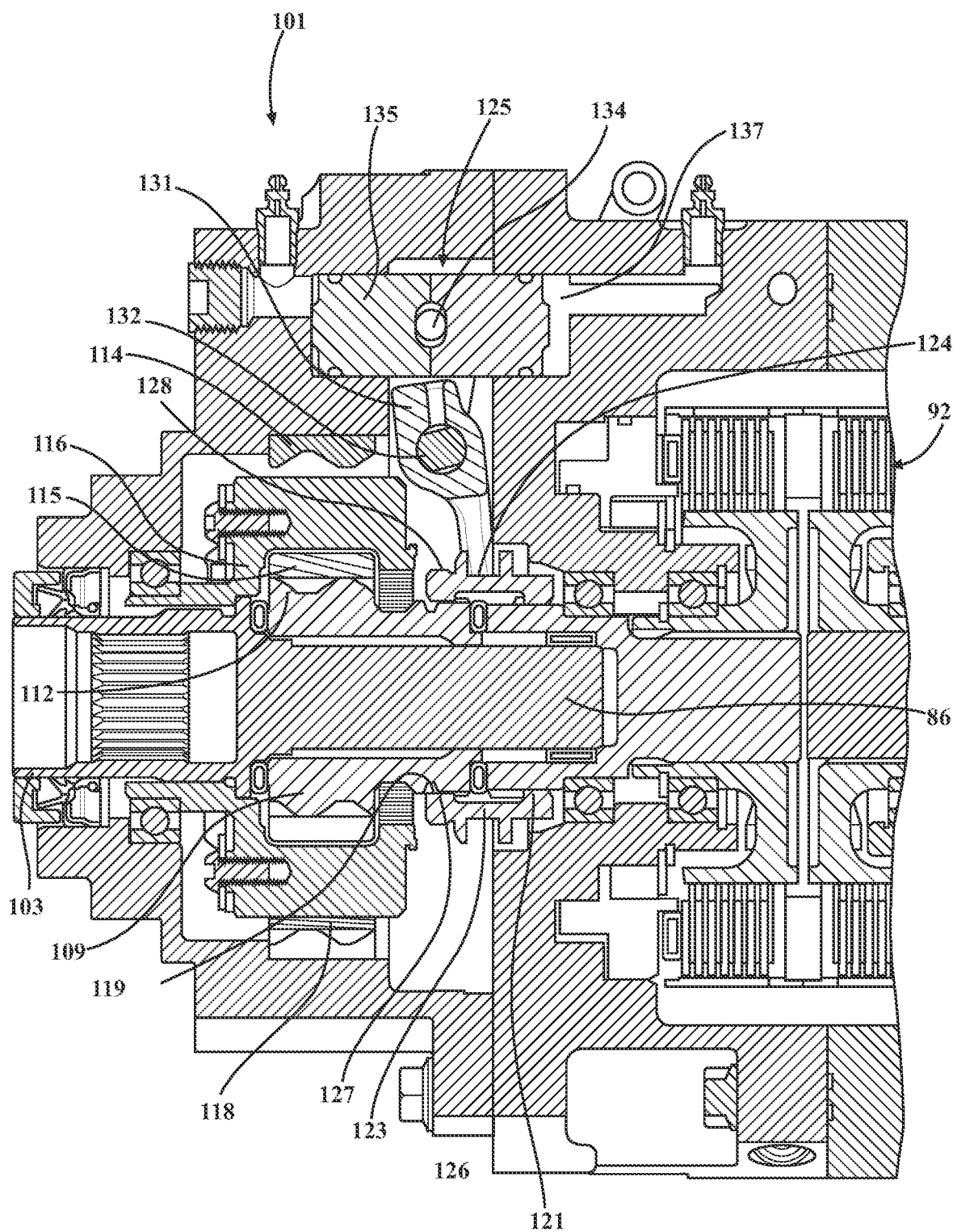
FIG. 10 is an enlarged cross-sectional view of FIG. 9 showing the left side shift assembly.
Figure 11:
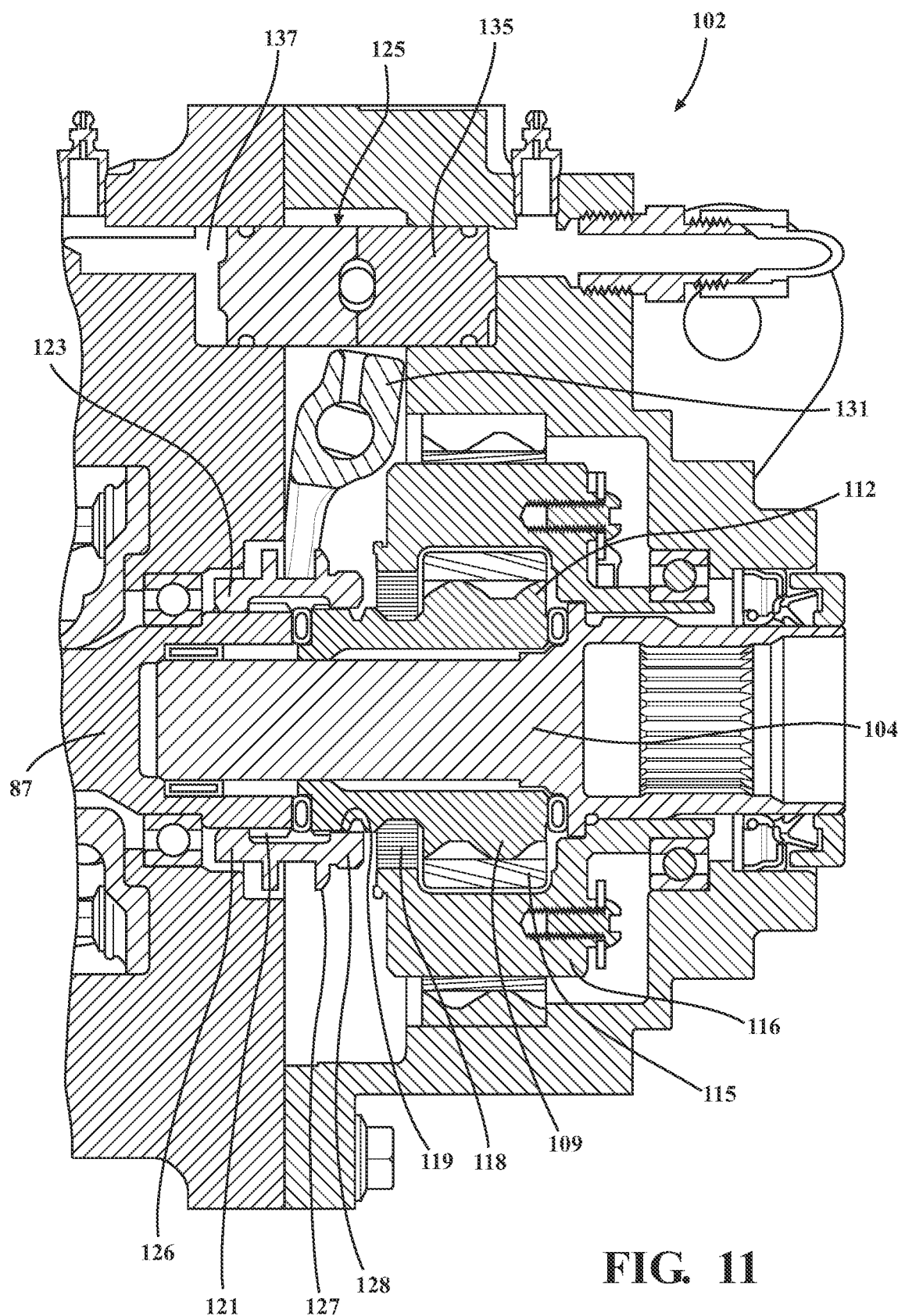
FIG. 11 is an enlarged cross-sectional view of FIG. 9 showing the right side shift assembly.

As noted above, the shift collar 123 is shiftable axially by the actuator 125 to shift from the hi-range mode of FIGS. 6-8 to the lo-range mode of FIGS. 9-11. In the lo-range mode of FIGS. 9-11, the main shaft 86/87 would transmit torque to the intermediate shaft 109 through the meshed drive teeth 121/126 to the drive collar 123 and through the meshed drive teeth 127/119 to the intermediate shaft 109, which in turn rotates the sun gear 112 to rotate the planet gears 115 and planetary carrier 116. As such, this torque transfer rotates the output shaft 103/104. The rotation speed and torque is governed by the meshed engagement of the planet gears 115 with the sun gear 112, which results in lower speed and higher torque transfer in comparison to the hi-range mode As referenced above, the actuator 125 preferably is a hydraulic actuator. In more detail as to FIGS. 7 and 8, the actuator 125 comprises a shift arm or lever 131, which is preferably supported by a pivot pin 132 to the housing of the shift assembly 101/102. The shift arm 131 includes at least one arm section 133 which engages with the pocket 124 formed in the shift collar 123, preferably by a radial pin in accord with the disclosure below. Pivoting of the shift arm 131 between the positions of FIGS. 7/8 and 9/10 displaces the shift collar 123 axially between the hi-range and lo-range modes and axially slides the drive teeth 127 and 128 into and out of engagement with the drive teeth 118 and 119.

The outer end of the shift arm 131 includes a pin-like connector 134 that connects to a linear actuator 135 such as a piston member slidably seated in a double-ended hydraulic piston chamber 137 formed in the housing 138. The actuator piston 135 is axially slidable within chamber 137 so as to move between an inward first position of FIGS. 7 and 8 to an outward second position of FIGS. 10 and 11, which thereby shifts the shift collar 123 between the hi-range and lo-range modes.

Figure 12:
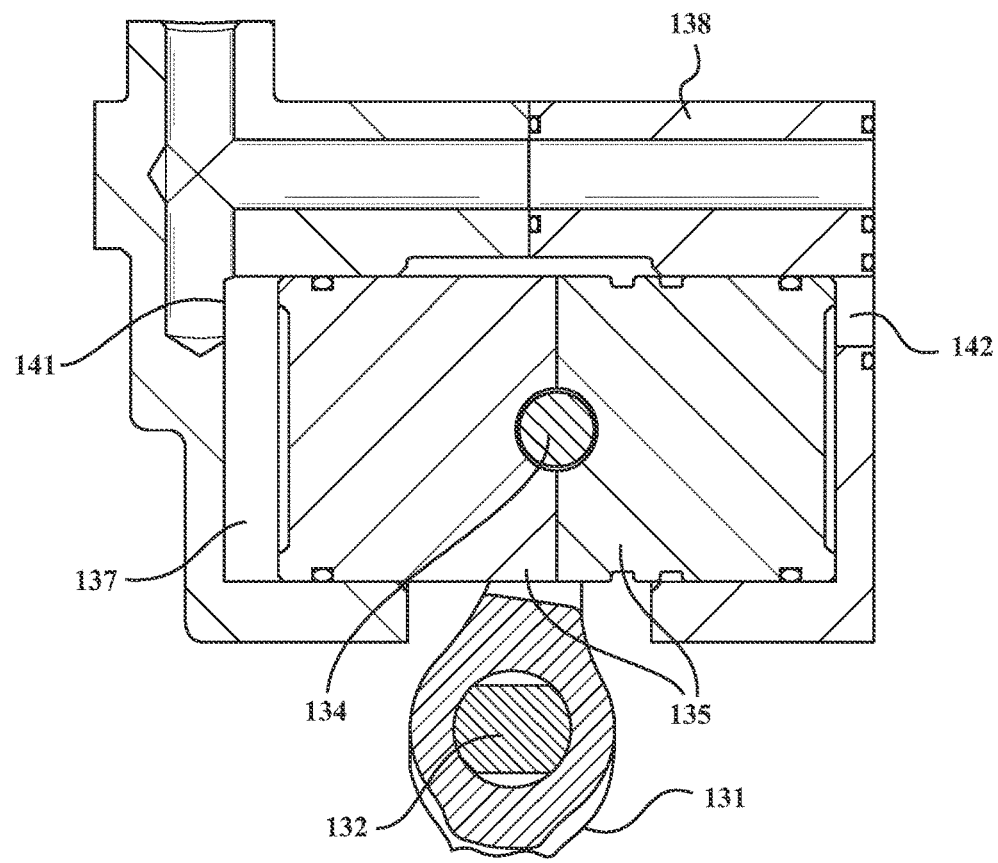
FIG. 12 is side cross-sectional view of a hydraulic actuator in a first embodiment thereof.
Figure 13:
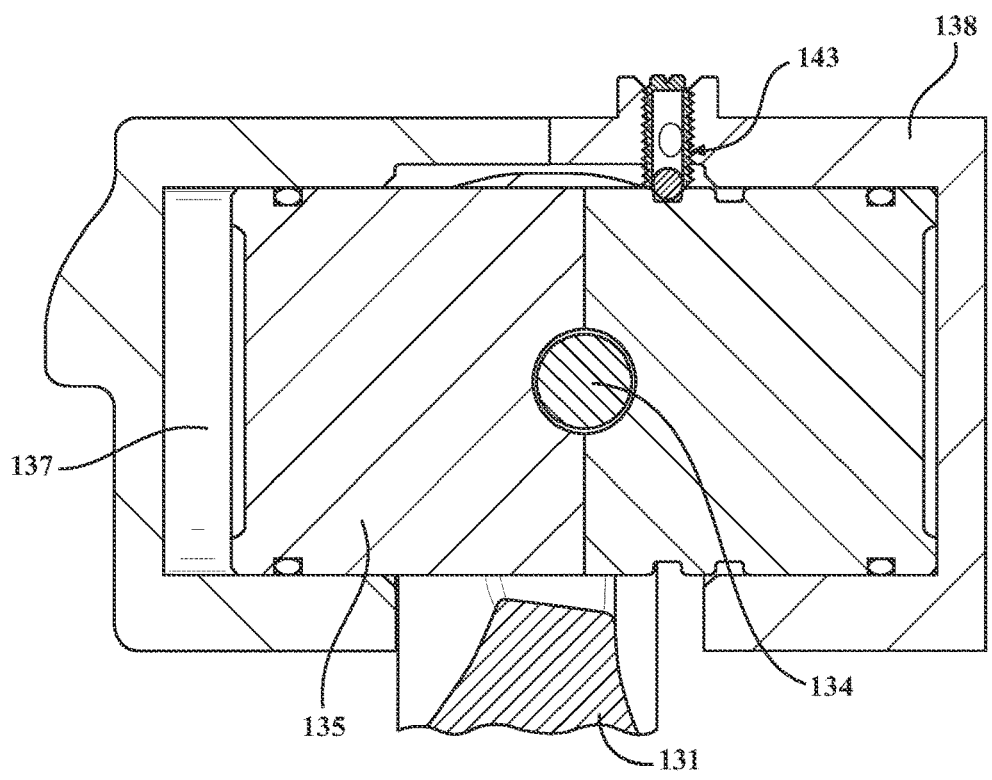
FIG. 13 is further side cross-sectional view of the hydraulic actuator of FIG. 12 as taken through a cutline offset from the cutline of FIG. 12.

In more detail as to FIGS. 12 and 13, the housing 138 is provided with fluid passages that define first and second ports 141 and 142 at the opposite ends of the piston chamber 137. The ports 141 and 142 are controlled by suitable valving (see FIG. 24) so that one end of the chamber 137 can receive hydraulic fluid through the port 141 to drive the piston rightwardly to the hi-range position of FIGS. 12 and 11, while the other port 142 allows hydraulic fluid to drain from the opposite end of the chamber 137. To shift the piston 135 in the opposite direction to the lo-range position of FIG. 8, the hydraulic fluid is switched and fed through port 142 and discharged from the other end of the piston chamber 137 through port 141 as will be described further below. In one embodiment, the piston 135 may remain in position when depressurized so that it is bi-stable, and move when pressurized.

In an alternate embodiment, the piston 135 may also include pockets 135A and 135B, which selectively engage with a ball detent or other piston retainer 143 to restrain the piston 135 in one operative position or the other in the event the hydraulic fluid is depressurized such as when the vehicle may be turned off. This arrangement provides for bi-directional movement of the piston 135 with positive piston retention by the retainer 143 so that the actuator 125 is bi-stable, in which bi-stable condition the actuator 125 remains in position until positively actuated such as by a controlled flow of hydraulic fluid. This embodiment does not include a spring return, such that the piston 135 is bi-stable and remains in place until hydraulic fluid pressure is reversed.

Figure 14:
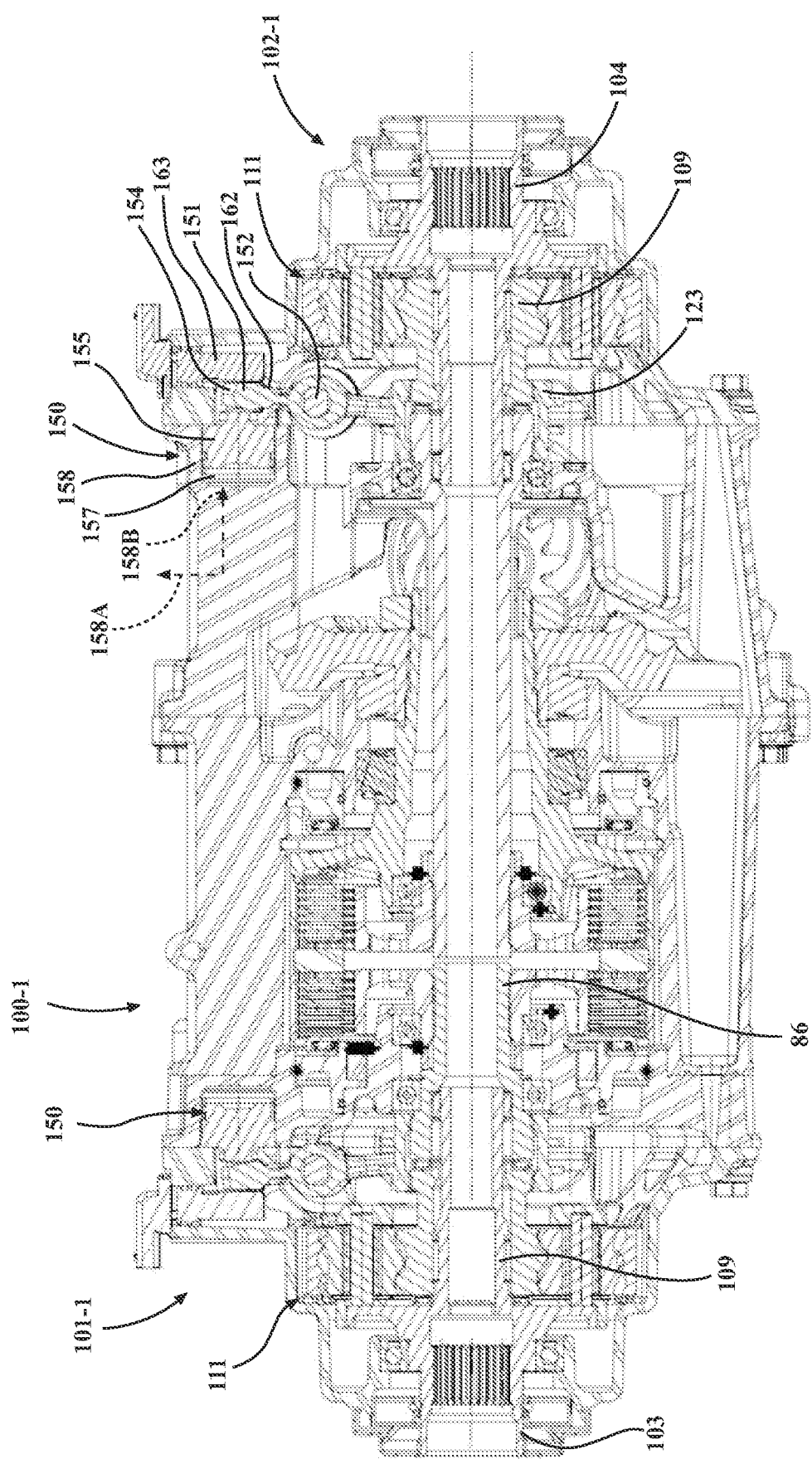
FIG. 14 is a side-cross sectional view of a third embodiment of the RDU with an alternate embodiment of a hydraulic actuator.
Figure 15:
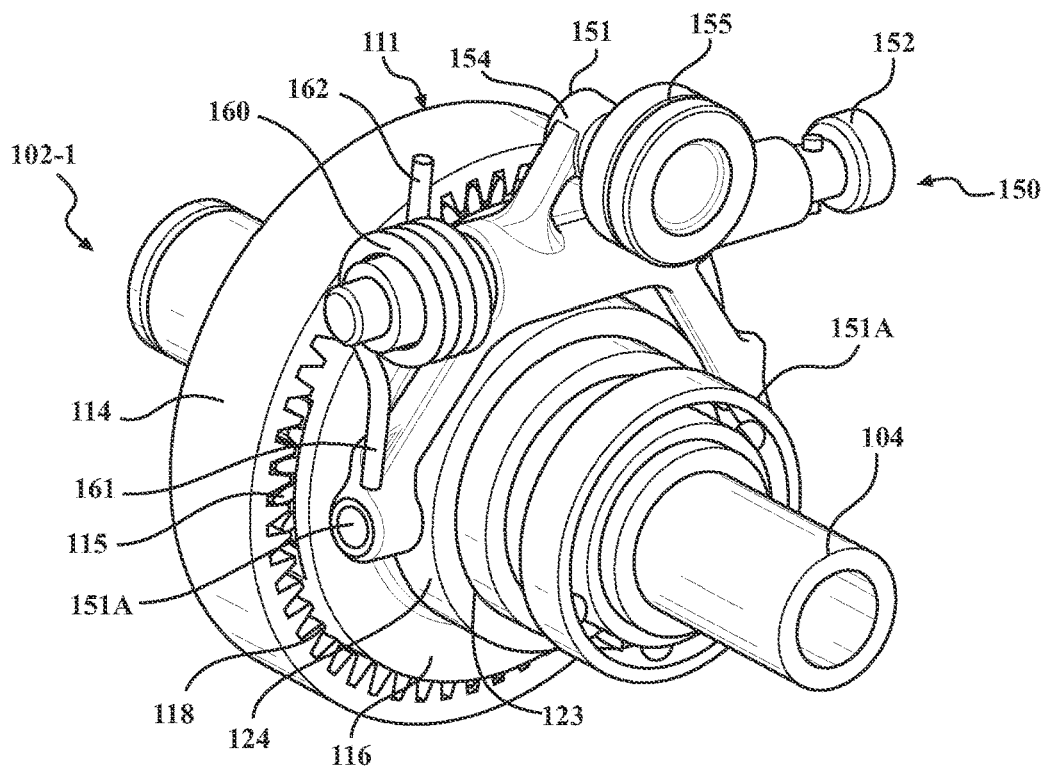
FIG. 15 is a partial perspective view of the shift assembly provided in the RDU of FIG. 14.
Figure 16:
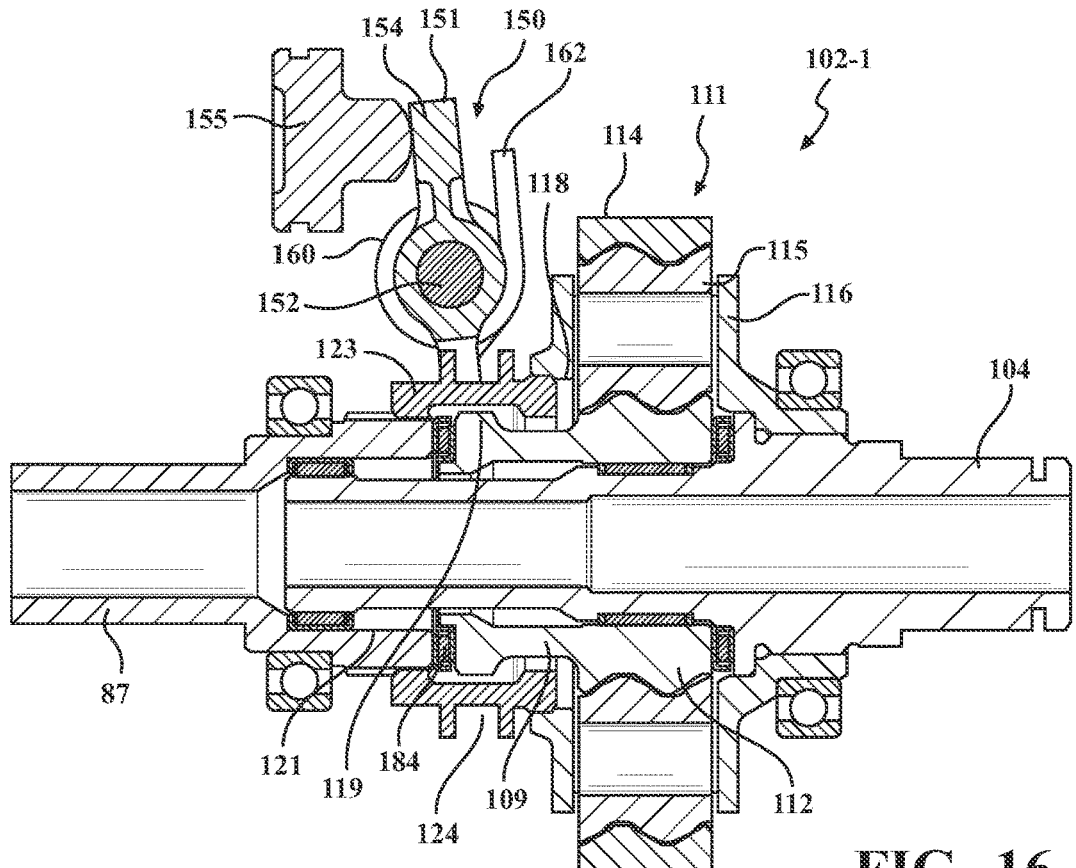
FIG. 16 is a side cross-sectional view of the right hand shift assembly provided in the RDU of FIG. 14, wherein the left hand shift assembly is a mirror image thereof.

Referring to FIGS. 14-16, a third embodiment of an improved RDU is again provided in a two-speed configuration and is identified by reference numeral 100-1. The RDU 100-1 is configured substantially the same as RDU 100 with common component parts identified by common reference numerals. The primary difference in RDU 100-1 relates to an alternate actuator 150, which is spring-biased so that it is mono-stable wherein the actuator 150 can be actuated in a first direction but automatically returns to its original position due to the spring bias generated therein. FIG. 14 shows a complete cross-section of the RDU 100-1, and FIGS. 15 and 16 show the right end shift assembly 102-1, which includes substantially the same components as the shift assembly 102 except for the actuator 150. The opposite left end shift assembly 101-1 uses the same component parts as shift assembly 102-1.

Like RDU 100, each end of the RDU 100-1 can include a shift assembly 101-1 and 102-1, wherein each shift assembly 101-1 and 102-1 is intermediately connected to the vehicle wheels to govern shifting of the speed output of the RDU 100-1 between hi-range and lo-range modes. Each shift assembly 101-1 and 102-1 uses most of the same components as the shift assemblies 101/102, wherein the shift assemblies 101-1 and 102-1 each includes its respective output shaft 103 and 104 interconnected to the respective main shaft 86/87, wherein the inboard end of the output shaft 103/104 connects directly to and is rotatably supported by the main shaft 86/87. An intermediate shaft 109 surrounds the inboard end of each output shaft 103/104 and is rotatably supported thereon.

To effect torque transmission between the main shaft 86/87 and output shaft 103/104, the planetary gear assembly 111 (FIGS. 14-16) is provided, which defines the alternate paths of torque transmission. In more detail, the planetary gear assembly 111 includes the sun gear 112, which is preferably formed integrally with the intermediate shaft 109. The planetary gear assembly 111 further includes a ring gear 114, which is concentric to the sun gear 112 in radially spaced, opposing relation. The planet gears 115 are meshed radially with the sun gear 112 and ring gear 114, and the planetary carrier 116 rotatably supports the planet gears 115. To selectively drive the planetary carrier 116, an inboard section 117 of the planetary carrier 116 includes the above-described drive formations preferably formed as drive teeth 118. The drive teeth 118 preferably face radially inwardly in this embodiment.

To switch between the hi-range and lo-range modes, the intermediate shaft 109 also includes the drive teeth 119, which face radially outwardly. The main shaft 88/89 includes similar drive formations formed as drive teeth 121 facing radially outwardly. The drive teeth 118, 119 and 121 are axially spaced apart and formed like gear teeth but other configurations of drive formations might be provided.

In accord with the foregoing disclosure, each shift assembly 101-1/102-1 includes the shift member 123, which may be an annular shift collar 123 that has an outer pocket 124 that is drivingly connected to the mono-stable actuator 150. The shift collar 123 is displaceable axially by the actuator 150 such as a mono-stable hydraulic actuator that is electrically controlled as described below relative to FIGS. 14-16. The shift collar 123 includes a main body that is formed with axially-spaced drive formations as previously described above relative to drive formations 126, 127 and 128, wherein the drive formations face radially inwardly and radially outwardly to mesh with the drive teeth 121, 119 and 118.

Generally, the shift collar 123 may shift axially between two axially spaced positions corresponding to the lo-range of FIG. 14 and the hi-range of FIG. 16. This shifting between the hi-range and lo-range modes by axial movement of the shift collar 123 has been described previously and a detailed discussion thereof is not required.

As referenced above, the actuator 150 preferably is a hydraulic actuator. In more detail as to FIGS. 14-16, the actuator 150 comprises a shift arm or lever 151, which is preferably supported by a pivot pin 152. The shift arm 151 preferably has a yoke or forked shape as seen in FIG. 15 to define one or more lower arm sections, which engage with the pocket 124 formed in the shift collar 123 preferably by radial connector pins 151A. Pivoting of the shift arm 151 about pin 152 displaces the shift collar 123 axially between the hi-range and lo-range modes.

The outer free end of the shift arm 151 includes a drive flange 154 that contacts a linear actuator 155, which may be a piston 155 slidably seated in a hydraulic piston chamber 157 formed in a housing 158. The piston 155 is axially slidable within chamber 157 so as to move between a first, extended position of FIG. 14 to a second, retracted position of FIG. 16, which thereby shifts the shift collar 123 between the lo-range and hi-range modes.

In more detail as to FIG. 14, the housing 158 is provided with fluid passages 158A diagrammatically shown that define at least one feed port 158B opening into the piston chamber 157 to selectively pressurize and depressurize the chamber 157. The port 158B is controlled by suitable valving (such as that disclosed in FIGS. 24 and 25 below) so that the chamber 157 can receive hydraulic fluid through the port 158B to drive the piston 155 rightwardly, while also allowing hydraulic fluid to drain from and depressurize the chamber 157, which allows the piston 155 to retract.

Further as seen in FIGS. 14-16, pivot pin 152 also supports a biasing member 160 thereon, which biases the arm 151 in the retraction direction to the hi-range mode while allowing the piston 155 to be extended and pivot the driver arm 151 to the lo-range mode. The biasing member 160 preferably is formed as a coil spring having a first spring arm 161 acting on the drive arm 151 and a second spring arm 162 restrained on the housing wall 163. Extension of the piston 155 pivots the drive arm 151 and tensions the spring 160 so that the spring 160 tends to bias the drive arm 151 back against the piston 155 and returns the piston 155 to the retracted position when hydraulic fluid is depressurized. The housing 163 defines one pivot stop for the drive arm 151 and the piston 155 defines the opposite pivot stop. This configuration is mono-stable since the drive arm 151 will automatically return to the initial position towards the piston 155 when it is depressurized, for example, when the vehicle key is in the off position. This embodiment of the actuator 150 may be advantageous for certain vehicle designs.

Figure 17:
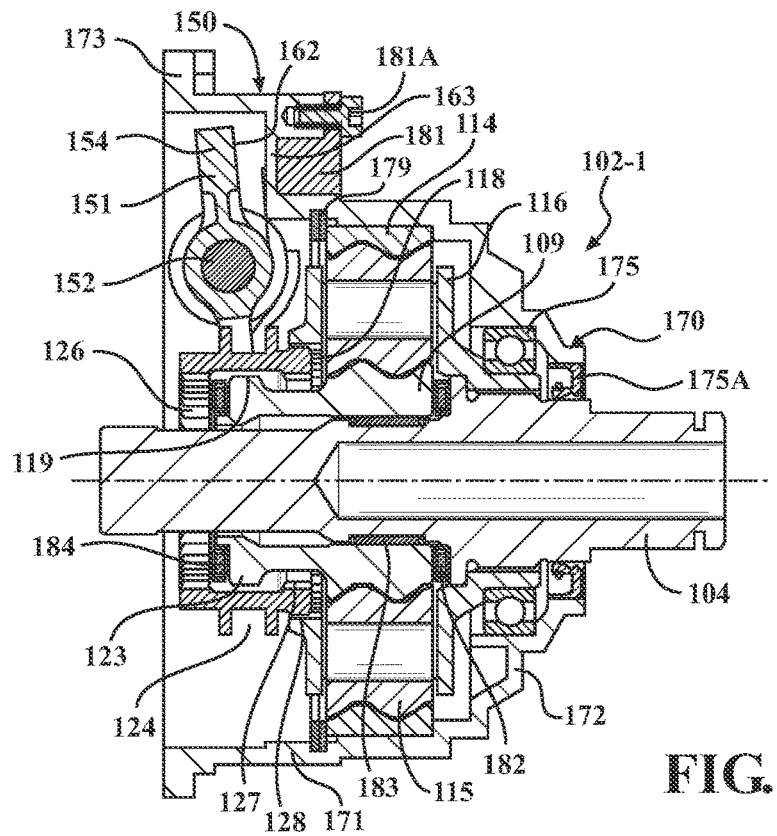
FIG. 17 is a side cross-sectional view of a shift assembly provided as a sub-assembly mountable to the RDU of FIG. 14.
Figure 18:
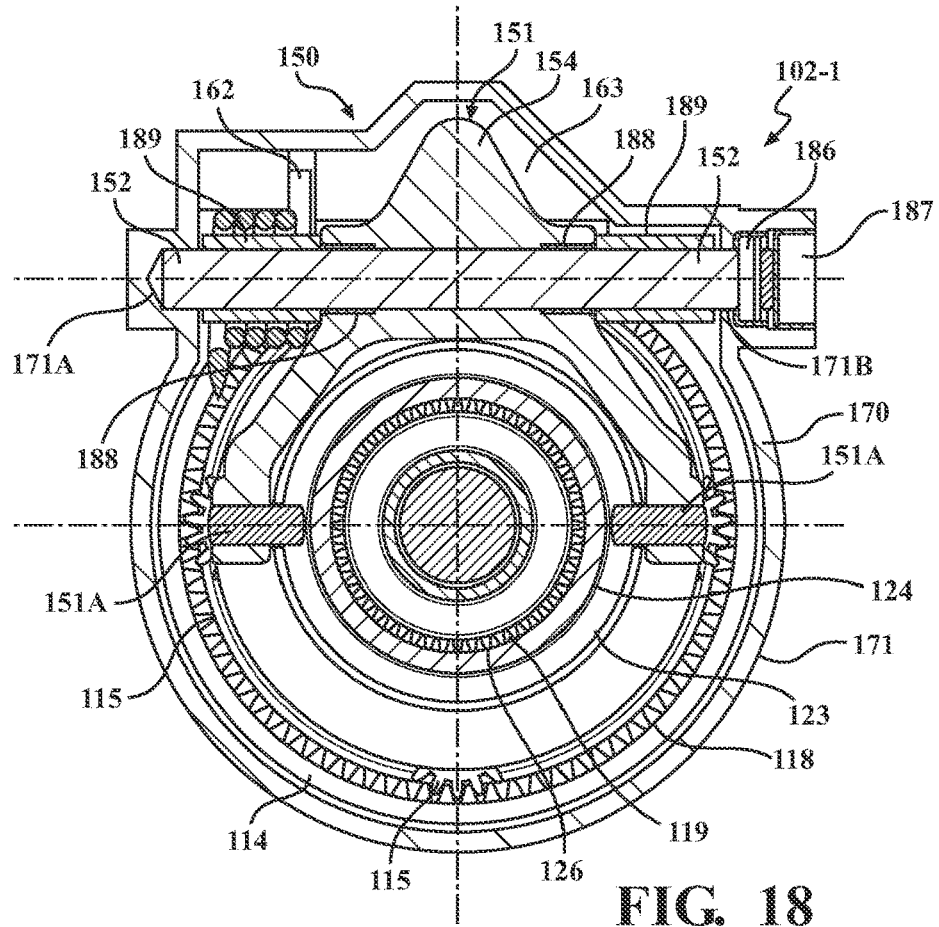
FIG. 18 is an inner end cross-sectional view thereof.
Figure 19:
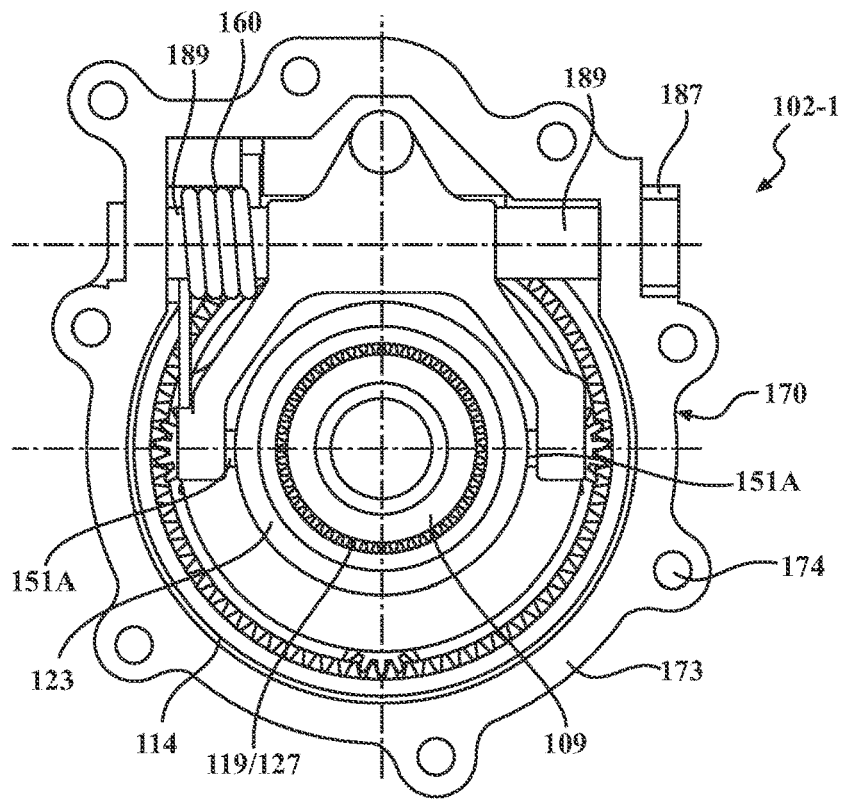
FIG. 19 is an inner end view thereof.
Figure 20:
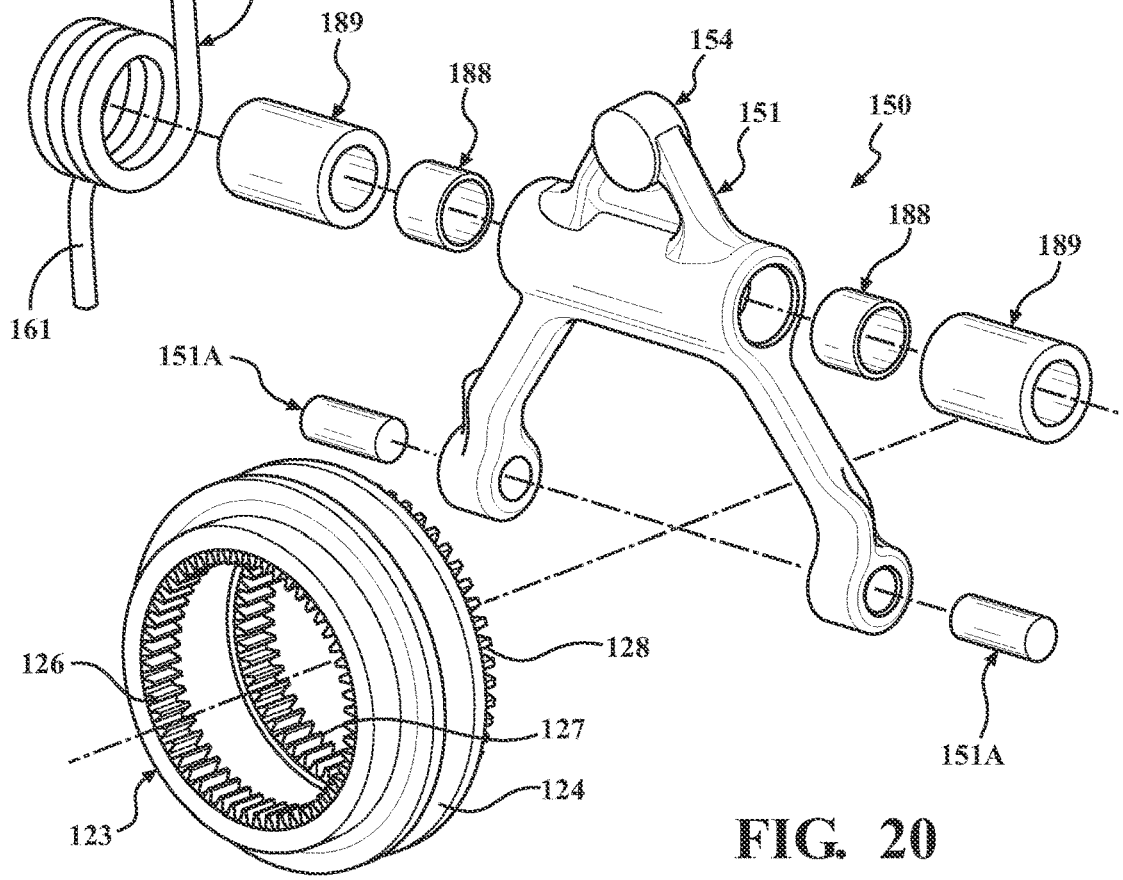
FIG. 20 is an exploded perspective view thereof showing a drive arm assembly with a drive arm and drive collar.
Figure 21:
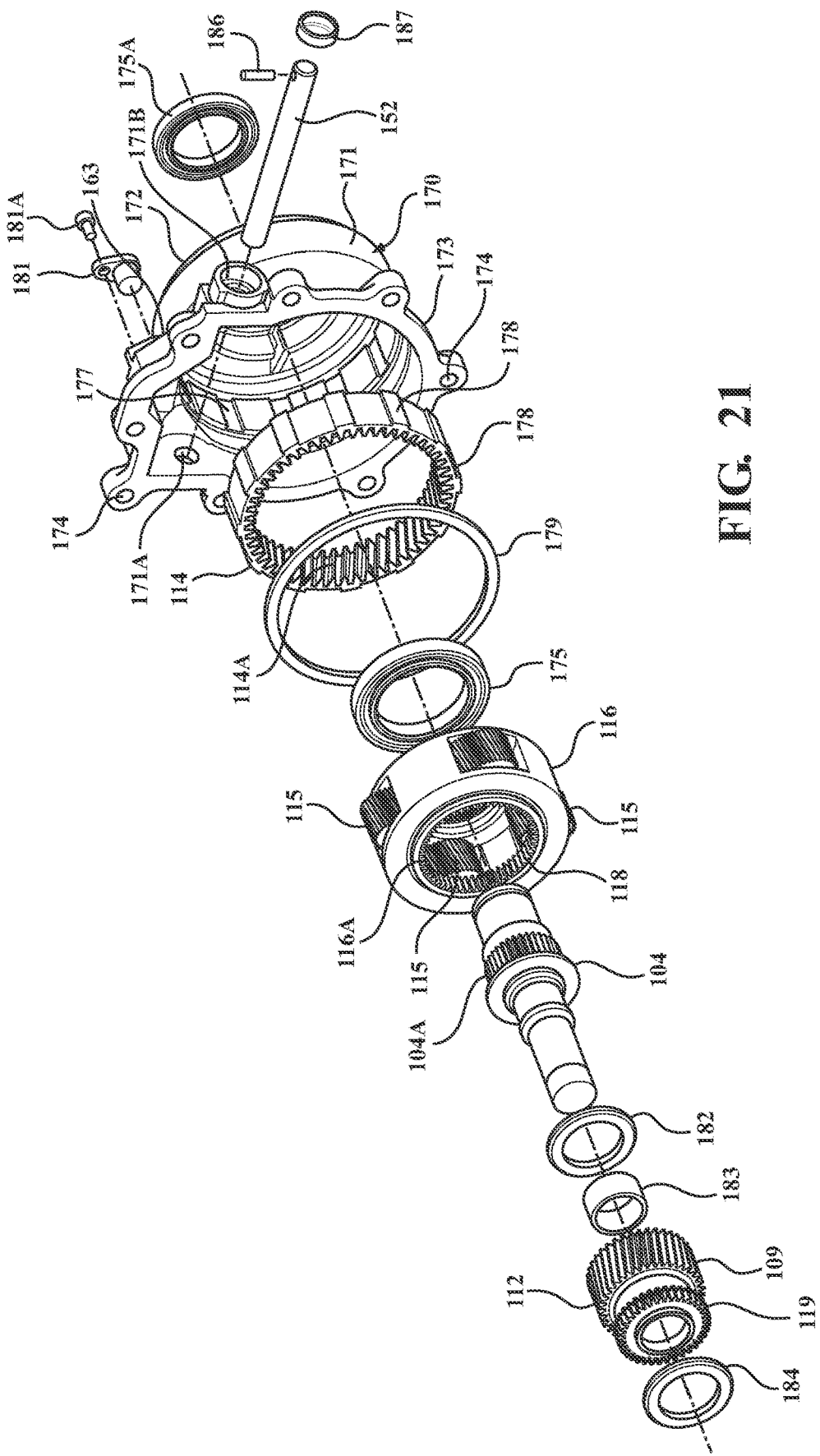
FIG. 21 is an exploded perspective view of the shift assembly of FIG. 17 showing the component parts thereof.

With respect to the shift assemblies as described above relative to FIGS. 1-16, each shift assembly 35/36, 101/102 and 101-1/102-1 preferably is formed as a modular assembly that can be preassembled together as a sub-assembly and then mounted to the main housing of the RDU. FIGS. 17-20 further illustrate the shift assembly 102-1 and actuator 150 as disclosed above with additional details as to the components thereof and the construction as a modular sub-assembly. In more detail, FIG. 17 is a side cross-sectional view of the shift assembly 102-1 of FIG. 14; FIG. 18 is an end cross-sectional view thereof; FIG. 19 is an end view thereof; and FIG. 20 is an exploded perspective view thereof showing the drive arm 151 and drive collar 123. FIG. 21 is an exploded perspective view of the shift assembly 102-1 showing the component parts thereof. While the shift assembly is shown in a right end orientation and thereby designated by reference numeral 102-1, the same shift assembly has a common modular construction and may be flipped to a left end orientation and would be designated by reference numeral 101-1.

The shift assembly 102-1 includes a main housing body 170 with a side wall 171, an end wall 172 and a mounting flange 173 in which bore holes 174 are provided for receiving bolts or other fasteners therethrough to fasten the shift assembly 102-1 to the RDU housing. The side wall 171 includes the output shaft 104 and planetary carrier 116 rotatably supported by a bearing 175 (FIG. 17). The planetary carrier 116 is non-rotatably coupled to the output shaft 104 by respective teeth or other locking formations 116A and 104A as seen in FIG. 21. The inboard and outboard ends of the output shaft 104 are configured to extend out of the housing body 170 as seen in FIG. 17, and the outboard end is sealed about the circumference of the shaft 104 by a seal ring 175A (FIGS. 17 and 21).

To non-rotatably support the ring gear 114 in the main housing body 170, the interior of the side wall 171 is shaped such as by including keys 177 that mate with corresponding keys 178 on outer surface of the ring gear 114 as seen in FIG. 21. The inner gear surface 114A is toothed so as to mesh with the planet gears 115 supported on the planetary carrier 116. A retaining ring 179 is formed as a snap ring fastened to the side wall 171 to axially restrain the ring gear 116 within the housing body 170.

The end wall 172 defines the wall section 163 described above, and includes a proximity sensor 181 held by fastener 181A. The sensor 181 detects the drive flange 154 to determine the stop position for the actuator piston 155. When the drive flange 154 abuts the wall section 163, the piston 155 remains pressurized to hold the shift assembly 102-1 in the lo-range mode.

As seen in FIGS. 17 and 21, the output shaft 104 further includes a thrust bearing 182 and needle bearing 183, which rotatably support the intermediate shaft 109 and the sun gear 112 on the outer surface of the output shaft 109 The inboard end of the intermediate shaft 109 also includes the drive teeth 119 as described previously. An additional thrust bearing 184 is provided at the shaft end as seen in FIGS. 17 and 21 for abutment against the main shaft 87 as seen in FIG. 16.

Referring again to FIG. 17, the shift collar 123 is also provided with the drive teeth 126, 127 and 128 on the inner and outer surfaces thereof, which function according to the foregoing disclosure. Normally, the outer teeth 128 are engaged with the inner carrier teeth 118 as seen in FIG. 17 in hi-range mode since the above-described spring 160 normally biases the shift collar 123 outwardly along the output shaft 104. This maintains the components engaged together prior to assembly on the main shaft 87.

To support the drive arm 151, the shift arm or lever 151 is preferably supported by the pivot pin 152 on the main housing body 170. The opposite ends of the pivot pin 152 are seated within side wall bores 171A and 171B (FIGS. 21 and 18) and held therein by a roll pin 186 and plug 187. The shift arm 151 is supported on the pivot pin 152 by bushings 188 and aligned axially by spacers 189 (see FIGS. 18-20). The spring 160 in turn is supported on one of the spacers 189.

The shift arm 151 preferably has a yoke or forked shape as seen in FIGS. 19 and 20 to define one or more lower arm sections which engage with the annular pocket or recess 124 formed in the shift collar 123 by the radial connector pins 151A (FIG. 18). Pivoting of the shift arm 151 about pin 152 displaces the shift collar 123 axially between the hi-range and lo-range modes. The outer end of the shift arm 151 includes the drive flange 154 that contacts the linear actuator 155 as described above.

Further, pivot pin 152 also supports the biasing member 160 thereon, which biases the arm 151 in the retraction direction. The biasing member 160 preferably is formed as a coil spring having a first spring arm 161 acting on the drive arm 151 and a second spring arm 162 restrained on the housing wall 163. Extension of the piston 155 pivots the drive arm 151 and tensions the spring 160 so that the spring 160 tends to bias the drive arm 151 back against the piston 155 and returns the piston 155 to the retracted position when hydraulic fluid is depressurized. The housing 163 defines one pivot stop for the drive arm 151 and the piston 155 defines the opposite pivot stop. As can be seen, this configuration is mono-stable since the drive arm 151 will automatically return to the initial position towards the piston 155 when it is depressurized such as when the vehicle key is in the off position.

Next referring to FIGS. 22 and 23A-23D, a further embodiment of an actuator 190 is disclosed, which provides an alternate hydraulic actuator that is usable in place of the mono-stable actuator 150 described above. The actuator 190 is engagable with a shift arm 191 formed similar to shift arm 131 but spring biased like shift arm 151. The shift arm 191 is preferably supported by the pivot pin 192 on the housing of the shift assembly 101-1/102-1 like the connection of the shift arm 151 to the housing 170 as described previously above. The shift arm 191 includes one or more inner arms 193 in a forked configuration wherein each arm 193 engages with the pocket 124 formed in the shift collar 123 by a respective radial pin 193A similar to the connection of the shift arm 151 with the radial pins 151A to the pocket 124. Pivoting of the shift arm 191 between the positions of FIGS. 23A and 23D displaces the shift collar 123 axially between the lo-range and hi-range modes in accord with the preceding disclosure. In the following discussion, the reference to lo-range and hi-range is selected for descriptive purposes to refer to shifting of the actuator from the lo-range to the hi-range when pressurized, but it will be understood that the orientation of the actuator 190 may be reversed so that the actuator 190 actuates from the hi-range to the lo-range when pressurized.

The primary difference between the shift arm 191 and shift arm 151 is that the outer end of the shift arm 191 includes the pin-like connector 194, which is similar to the connector pin 134 and connects to the actuator 190. The actuator 190 preferably is a linear actuator formed as a piston 196 to which the shift arm 191 is pivotally connected by the connector 194. The shift arm 191 is spring-biased by a spring 160 like that of FIG. 20, wherein the spring 191 normally biases the piston 196 to the leftward hi-mode position of FIG. 23D but allows rotation of the shift arm 191 to the rightward lo-range position of FIGS. 22 and 23A.

The piston 196 is slidably seated in a hydraulic piston chamber 197 (FIG. 22) formed in an RDU housing 198. The actuator piston 196 is axially slidable within chamber 197 so as to move between the first position of FIGS. 22 and 23A and the second position of FIG. 23D, which thereby shifts the shift collar 123 from one to the other of the lo-range and hi-range modes.

The housing 198 may be formed by a first housing section 199 and a second housing section 200, which are assembled together to form the chamber 198. The first housing section 199 may include a blind bore 201, which is open on one side to receive the free end of the piston 196 therein. The opposed faces of the blind bore 201 and piston end face form a section of the chamber 197 that is pressurized by a hydraulic feed line or pressure line 202 through a feed port 202A. The feed line 202 pressurizes and depressurizes the chamber 197 by inflow and outflow of hydraulic fluid into and out of the chamber 197 through port 202A. When the key is on and vehicle is operated, the hydraulic fluid controls shifting between the hi-range and lo-range positions, and when the key is off, hydraulic fluid typically is depressurized, which normally would allow the piston 196 to shift leftwardly due to biasing of the spring 160 in a manner similar to the actuator of FIG. 14-16. However, the actuator 190 also includes a lockout unit 205, which is releasably engageable with the piston 196 to lock the piston 196 in the rightward position of FIG. 23A and release or unlock the piston 196 to allow spring biasing of the piston 196 back to the leftward position of FIG. 23D.

Figure 23A:
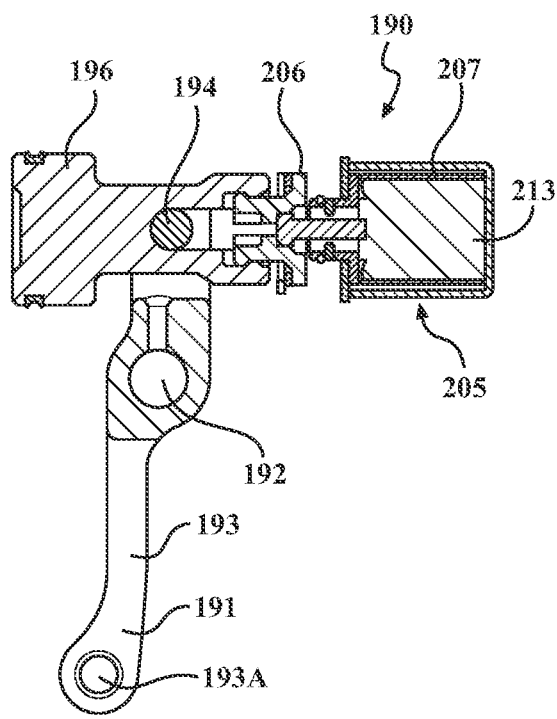
FIG. 23A is a partial side cross-sectional view of the actuator of FIG. 22 in a first operative condition.
Figure 23B:
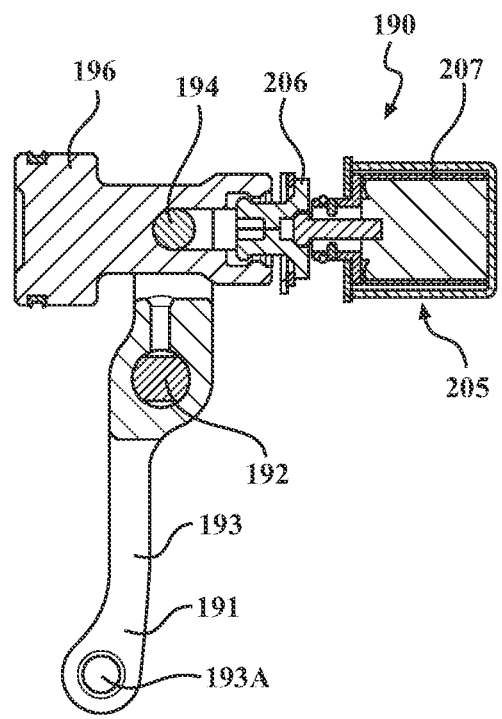
FIG. 23B is a partial side cross-sectional view of the actuator of FIG. 22 in a second operative condition.

In more detail as to the actuator 190, the actuator 190 includes a lockout connector preferably formed as a split lockout collar 206, which releasably grips or connects to the piston 196, and an actuator device 207, which actuates the lockout collar 206 between unlocked and locked conditions as seen in FIGS. 23B and 23A respectively. The piston 196 includes a connector pocket 208, which opens towards the actuator device 207 and includes an annular rim or stop flange 209 projecting radially inwardly. The lockout collar 206 includes axially-extending catches 210 that have radial shoulders 210A, which are engageable with the flange 209. The lockout collar 206 is radially expandable and collapsible as seen in FIGS. 23A and 23B such that catches 210 move radially outwardly and inwardly to grip and ungrip the piston 196.

The lockout collar 206 further includes an expansion pocket 211, which has a narrow section 211A and a wide section 211B that are configured to receive the end of a driver 212. The driver 212 preferably is formed as a solenoid pin of a linear actuator that serves as the actuator device 207. The driver 212 is axially movable by the solenoid 213 so as to retract rightwardly when powered as seen in FIG. 23B and automatically returns to the extended position of FIG. 23A when unpowered.

Figure 22:
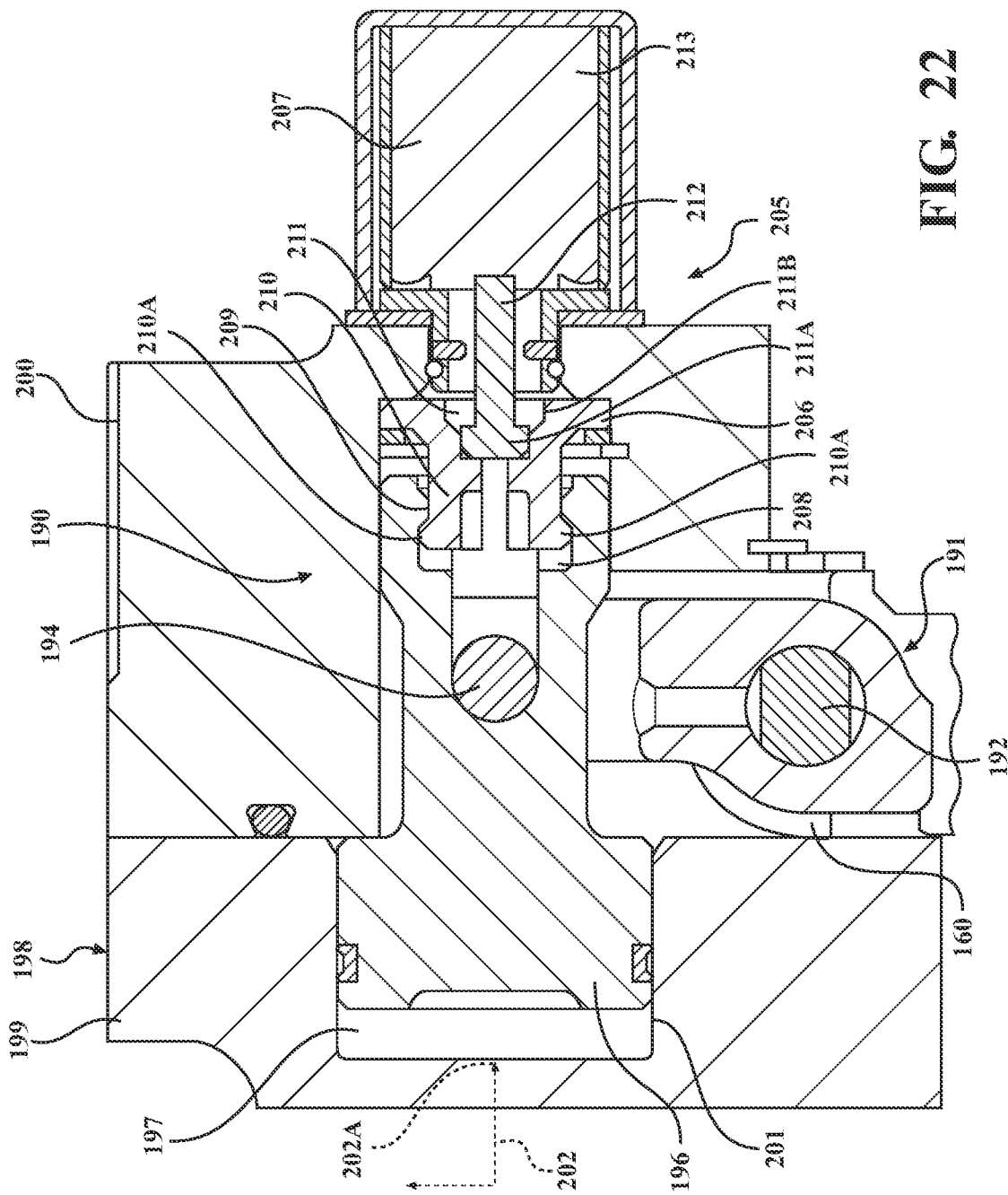
FIG. 22 is a side cross-sectional view of a third embodiment of a hydraulic actuator.

More specifically, when the driver 212 is extended as seen in FIGS. 22 and 23A, the expanded head of the driver 212 pushes axially into the narrow pocket section 211A which stretches and expands the lockout collar 206 and displaces the catches 210 radially outwardly into engagement with the stop flange 209 of the piston pocket 208 to thereby grip the piston 196. As a result, the piston 196 is held axially in the rightward lo-range position and holds the piston 196 in this position if the hydraulic fluid is depressurized. When the key is on, the piston chamber 197 may be pressurized and the hydraulic fluid would have sufficient pressure to maintain the piston 196 in the rightward lo-range position. However, if the key is off and fluid is depressurized, the lockout collar 206, when expanded, will hold the piston 196 in position. Since the driver 212 is normally extended when the solenoid 207 is unpowered, the key off position cuts power to the solenoid 207 but the solenoid 207 normally locks the piston 196 in this position.

Figure 23C:
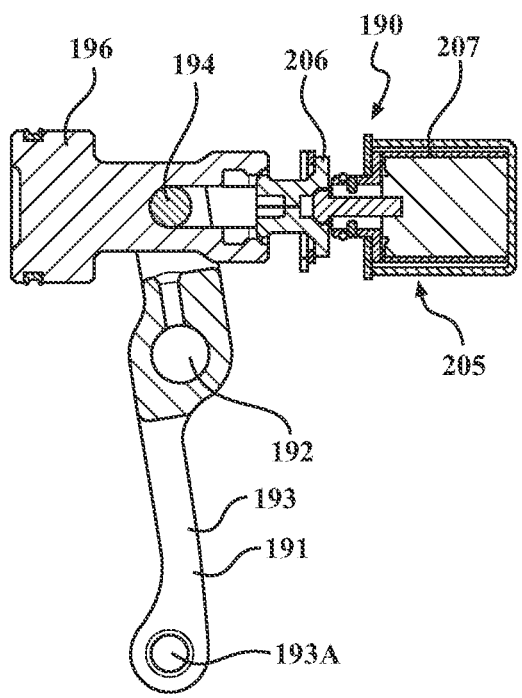
FIG. 23C is a partial side cross-sectional view of the actuator of FIG. 22 in a third operative condition.

To release the piston 196, the solenoid 207 can be powered by the vehicle controller to retract the driver 212 and pull the driver head back to the wider pocket section 211B as seen in FIG. 23B, which allows the lockout collar 206 to collapse inwardly and release its grip on the piston 196. As seen in FIG. 23B, the piston 196 can move rightwardly or leftwardly into and out of the hi-range and lo-range positions without interference with the driver 212. If the piston chamber 197 is pressurized, the piston 196 may remain in this position. However, if depressurized, the spring 160 can automatically return the piston 196 leftwardly as seen in FIG. 23C to thereby shift or actuate the shift assembly 101/102 to the lo-range mode. To shift from the hi-range to lo-range, the piston chamber 197 is pressurized and the solenoid 207 is powered to shift the piston 196 rightwardly from the position of FIG. 23C to the position of FIG. 23B. The solenoid 207 can then be powered or unpowered depending upon whether the key is on or off and the piston chamber 197 pressurized or not.

Figure 23D:
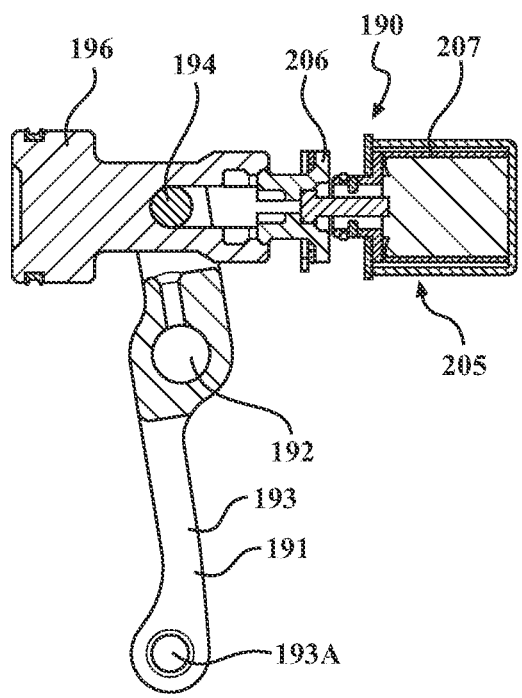
FIG. 23D is a partial side cross-sectional view of the actuator of FIG. 22 in a fourth operative condition.

Referring to FIG. 23D, the piston 196 is shifted to, for example, the hi-range state and if desired, the piston chamber 197 may be depressurized and the solenoid 207 unpowered to allow the driver 212 to extend and expand the lockout collar 206. Since there is some interference between the lockout collar 206 and piston pocket 208, the piston 196 may be held in the leftward state due to the interference and spring bias even if the piston chamber 197 is depressurized.

In this manner, the piston 196 can remain in either the hi-range or lo-range states even if the vehicle is off and the hydraulic fluid is depressurized in the piston chamber 197. In other words, the actuator 190 is bi-stable so as to be positively restrained in both of the hi-range and lo-range states even in the absence of power and hydraulic fluid pressure. While the actuator 190 preferably is configured as part of a shift assembly 101-1/102-2, it will be understood that the actuator 190 may have other applications in which a bi-stable hydraulic actuator is usable.

In the above-described embodiments of the inventive RDU units, different embodiments of hydraulic fluid control systems or circuits may be employed. Generally as to FIG.

24, the preferred control system 220 includes a main control circuit 221 for controlling clutch systems of the RDU embodiments, and a secondary shift control circuit 222, which may vary depending upon the shift assembly embodiment being employed. The main control circuit 221 generally includes reservoir of hydraulic fluid with a pump P driven by a motor M, which draws and pressurizes the hydraulic fluid from the reservoir. The main control circuit 221 operates to control operation of the various sets of left hand and right clutches LH/RH (see clutches 30/31 and 93/94) of the RDU embodiments disclosed above. The hydraulic fluid is supplied to the LH piston and RH piston by pressure fluid lines P1 and P2, which are selectively controlled by respective linear solenoids 1 and 2. Check valves 1 and 2 may also be provided. This main control circuit 221 is provided for each RDU embodiment disclosed above so that the main control circuit 221 drives both the single-speed RDU 80 and the two-speed RDU's 10, 100, and 100-1.

In the single-speed RDU 80, the shift control circuit 222 would be omitted. However, in the two-speed RDU's 10, 100 and 100-1, the shift control circuit 222 would also be provided to control shifting of the shift assemblies disclosed above.

Figure 24:
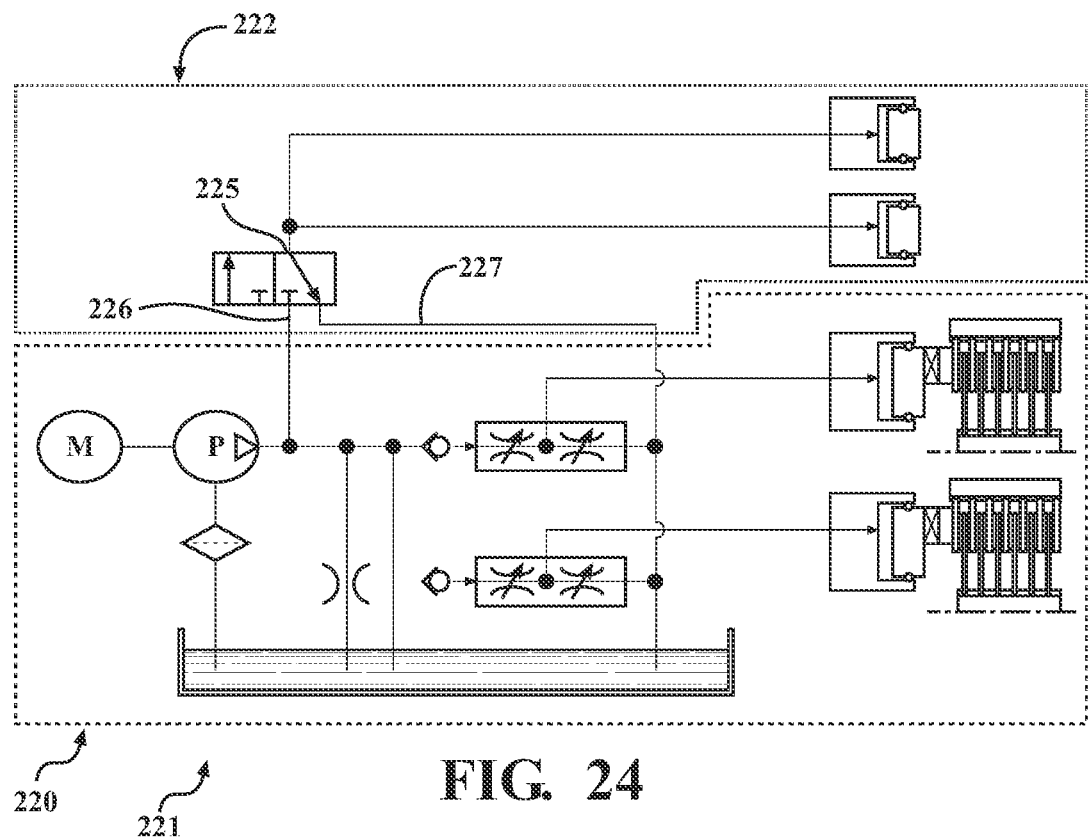
FIG. 24 is a diagrammatic view of a hydraulic circuit showing a main clutch control circuit for one-speed and two-speed RDU's and a secondary shift control circuit for shift assemblies of a two-speed RDU.
Figure 25:
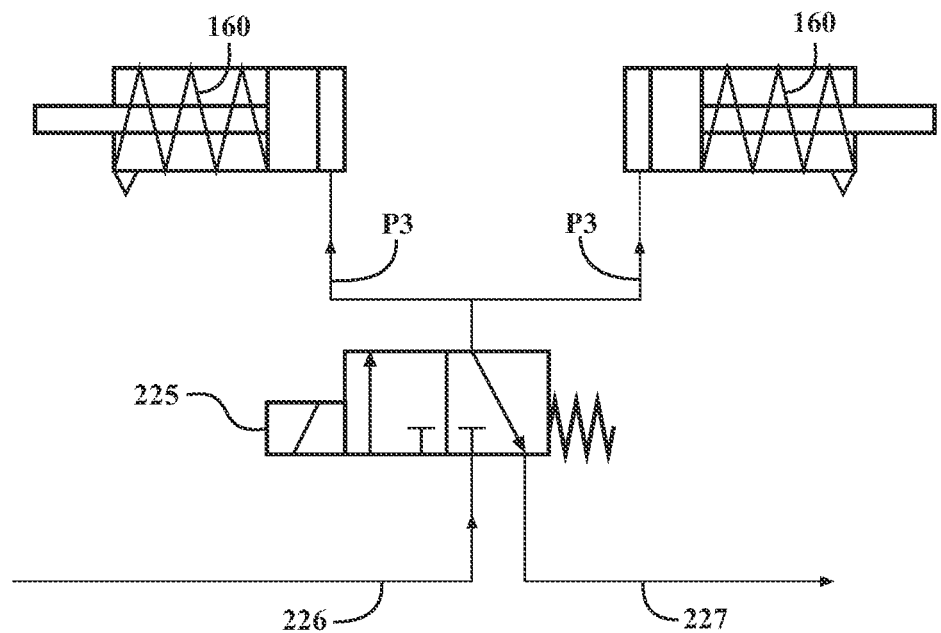
FIG. 25 is a diagrammatic view of a hydraulic circuit of a single-valve shift control circuit in a first embodiment for controlling a mono-stable actuator.

For mono-stable shifting, FIGS. 24 and 25 illustrate the LH planetary shift and RH planetary shifters (35/36, 101/102) being connected to pressure lines P3 that are simultaneously pressurized and de-pressurized by a 3/2 on/off valve 225 that is normally closed. The valve 225 is fed with pressure line 226 that receives pressurized fluid from the pump P, and discharges fluid through pressure line 227, which in turn discharges to the reservoir or sump of main control circuit 221. The valve 225 may be controlled by a solenoid and a return spring as is known with valves of this type. The valve 225 connects to pressure lines P3 to selectively pressure or depressurize the pressure lines P3 and thereby control the LH and RH planetary shifters (35/36, 101-1/102-1) in accord with the preceding disclosure. In the illustrated control circuit 220, the pressure lines P3 connect to the actuators 150 or 190 wherein return movement results from the spring bias of a return spring. While a return spring might be provided in the actuator piston, the illustrated embodiments preferably rely upon the return spring 160 in actuators 150/190.

Figure 26:
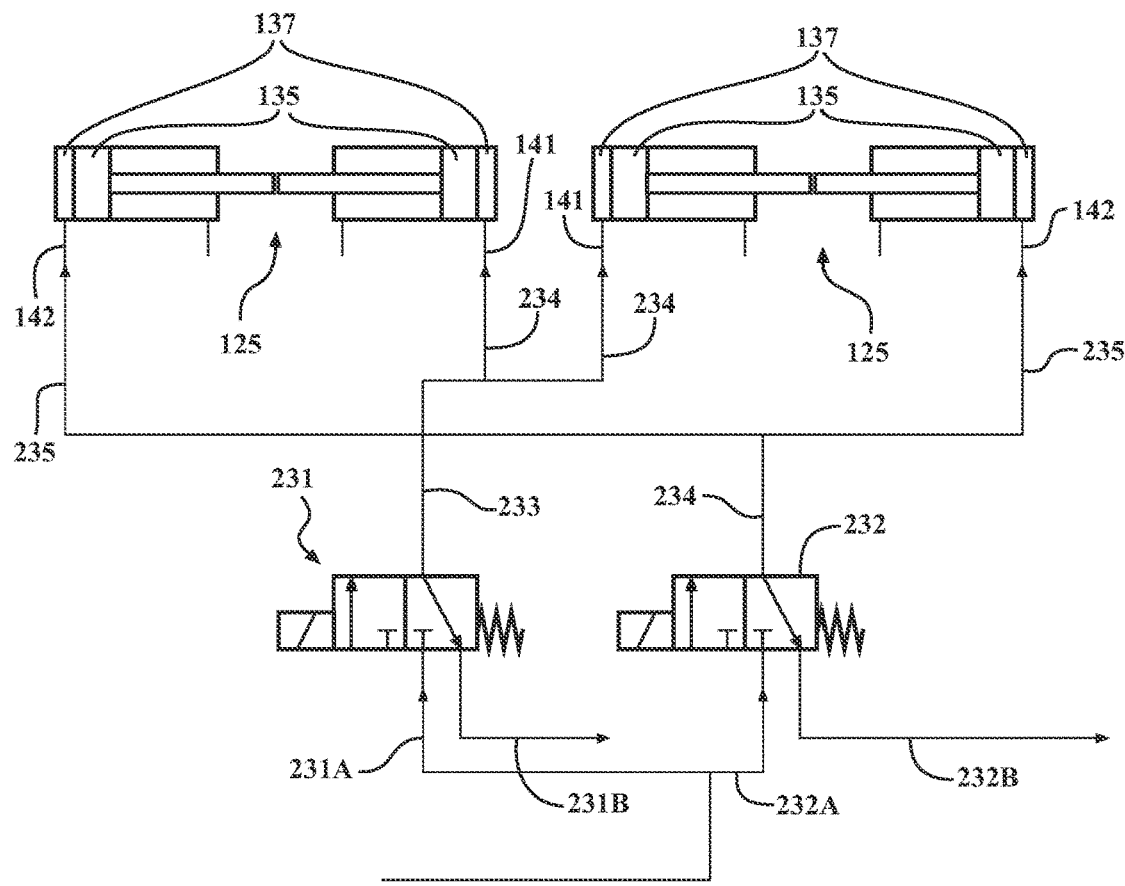
FIG. 26 is a diagrammatic view of a hydraulic circuit of a double-valve shift control circuit in a second embodiment for controlling a bi-stable actuator.
Figure 27:
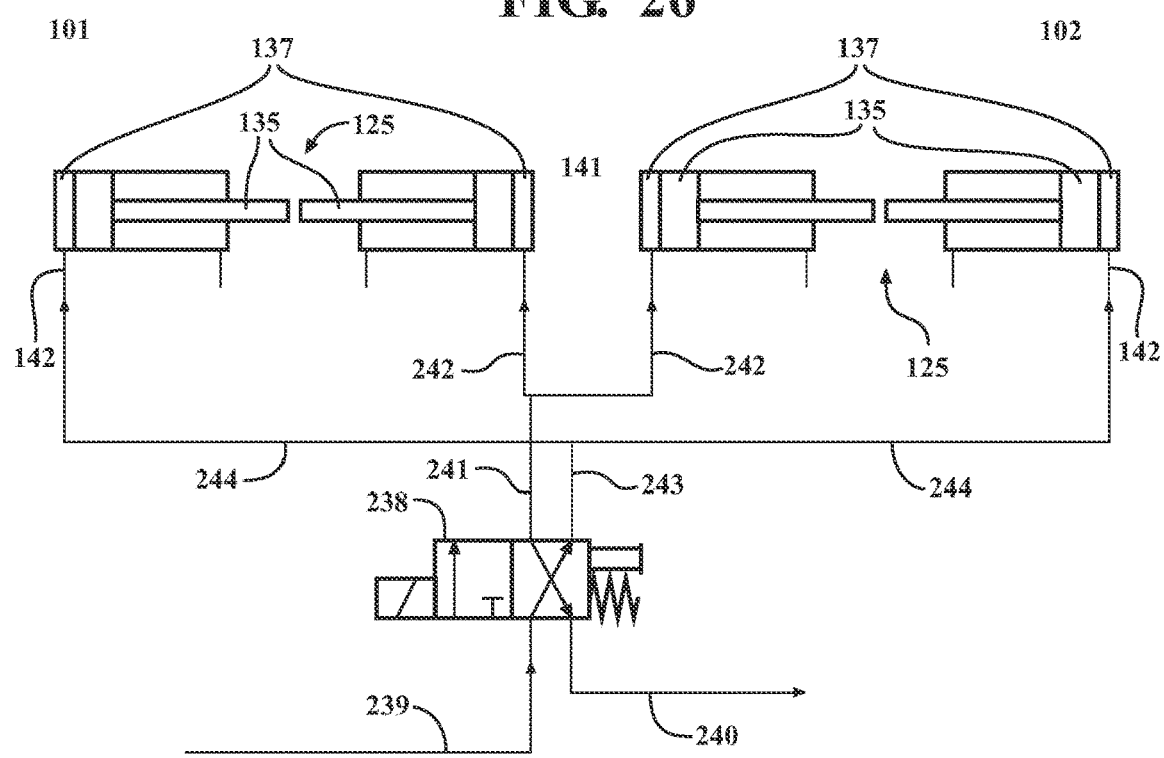
FIG. 27 is a diagrammatic view of a hydraulic circuit of a single-valve shift control circuit in a third embodiment for controlling a bi-stable actuator.

For the bi-stable actuator 125, an alternate shift control circuit 221-1 may be provided in a single-valve or double-valve configuration (see FIGS. 26 and 27). In both figures, the single piston actuator 125 for both the left hand and right hand sides has the piston 135 split into RH Hi and LH Lo pistons for diagrammatic purposes, wherein the RH Hi and RH Lo pistons are defined by the opposite ends of the piston 135 being driven by the opposite ends of the piston chamber 137. The opposite chamber ends of piston chamber 137 are supplied with or discharge hydraulic fluid through the lo-range ports 141 and hi-range ports 142 (see FIG. 12).

With respect to FIG. 26, a dual-valve configuration is provided wherein each actuator 125 is controlled by a respective 3-2 valve 231 and 232. The valves 231 and 232 connect to pressure lines 231A and 232A that receive pressurized fluid from the pump P, and discharge through pressure lines 231B and 232B to discharge to the reservoir or sump of main control circuit 221. The valves 231 and 232 may be controlled by a solenoid and a return spring as is known with valves of this type. The valves 231 and 232 each feed a pressure line 233 and 234, which in turn feeds two pressure lines 235 and 236 that either connect to the lo-range side of the piston chamber 137 by port 141 or the hi-range side of the piston chamber 137 by port 142. As such, one valve 231 controls shifting of the pistons 135 to the lo-range mode and the other valve 232 controls shifting of the pistons 135 to the hi-range mode.

With respect to FIG. 27, a single-valve configuration is provided wherein both actuators 125 are controlled by a single 4-2 valve 238. The valve 238 connects to a pressure line 239 that receives pressurized fluid from the pump P, and discharges through pressure lines 240 to discharge to the reservoir or sump of main control circuit 221. The valve 238 may be controlled by a solenoid and a return spring as is known with valves of this type. The valve 238 feeds a pressure line 241, which in turn feeds two pressure lines 242 that connect to the lo-range side of the piston chamber 137 by ports 141, and the valve 238 also feeds a pressure line 243, which in turn feeds two pressure lines 244 that connect to the hi-range side of the piston chamber 137 by ports 142. As such, valve 238 controls shifting of both pistons 135 to both the lo-range mode and the hi-range mode.

The invention has been described in an illustrative manner, and it is to be understood that the terminology, which has been used, is intended to be in the nature of words of description rather than of limitation. Many modifications and variations of the present invention are possible in light of the above teachings. It is, therefore, to be understood that within the scope of the appended claims, the invention may be practiced other than as specifically described.

The invention claimed is:

1. A vehicle drive unit for driving wheels of a vehicle comprising:
   a main shaft which is rotatable for driving a vehicle wheel;
   an input shaft for selective driving of said main shaft; and
   a shift assembly, which includes an output shaft which is engagable with the vehicle wheel and is rotatable about a shaft axis in response to rotation of said main shaft, an intermediate shaft, which is rotatable about said shaft axis, and a planetary gear assembly which transfers torque between said main shaft and said output shaft;
   said planetary gear assembly comprising a sun gear rotatable with said intermediate shaft, a ring gear disposed radially outwardly of said sun gear, and a planetary carrier assembly comprising a planetary carrier rotatably supporting one or more planet gears thereon, wherein said planetary carrier is engaged with said output shaft for rotation together and said planet gears rotate between said sun gear and said ring gear during rotation of said output shaft; and
   said shift assembly further which is shiftable to connect said main shaft either to said intermediate shaft in a first shift mode or to said planetary carrier assembly in a second shift mode, wherein said shift assembly in said first shift mode connects said main shaft to said intermediate shaft to cause said intermediate shaft to rotate said sun gear and transfer torque along a first torque transmission path through said planetary carrier assembly to said output shaft, and wherein said shift assembly in said second shift mode connects said main shaft to said planetary carrier to cause said planetary carrier assembly to rotate said planet gears and transfer torque along a second torque transmission path through said planetary carrier assembly to said output shaft, wherein said first and second torque transmission paths rotate said output shaft at respective first and second speeds in response to rotation of said main shaft;

wherein said first and second speeds differ from each other;

wherein said output shaft rotates in a lo-range mode or hi-range mode corresponding to said first and second speeds depending upon said shift assembly being shifted between said first and second shift modes;

wherein said shift member includes first and second drive formations, said first drive formations being engaged with said main shaft in both of said first and second shift positions;

wherein said shift assembly includes a shift member movable between first and second shift positions, said shift member being connected to said main shaft in both of said first and second shift positions, and being connected to either said intermediate shaft in said first shift position or said planetary carrier assembly in said second shift position, wherein said shift member in said first shift position is connected to said intermediate shaft to cause said intermediate shaft to rotate said sun gear and transfer torque along said first torque transmission path, and said shift member in said second shift position is connected to said planetary carrier to cause said planetary carrier assembly to rotate said planet gears and transfer torque along said second torque transmission path;

wherein said shift member is shiftable axially along said shaft axis between said first and second shift positions; and wherein said intermediate shaft and said planetary carrier assembly including respective third and fourth drive formations, wherein said second drive formations of said shift member engage said third drive formations of said intermediate shaft in said first shift position and engage said fourth drive formations of said planetary carrier assembly in said second shift position.

2. The vehicle drive unit according to claim 1, wherein said vehicle drive unit is configured as a rear drive unit for driving rear wheels of the vehicle.

3. The vehicle drive unit according to claim 1, which includes a main housing that rotatably supports said input shaft and said main shaft, and said shift assembly is a modular sub-assembly of said vehicle drive unit that is removably mountable to said main housing.

4. The vehicle drive unit according to claim 1, which includes a clutch assembly which selectively couples and decouples torque transmission between said input shaft and said main shaft for selective connection and disconnection of said vehicle drive unit.

5. The vehicle drive unit according to claim 4, which a main control circuit for hydraulically controlling said clutch assembly, and a secondary shift control circuit to hydraulically control shifting between the hi-range and lo-range modes.

6. A vehicle drive unit for driving wheels of a vehicle comprising:
 a main housing;
 one or more main shafts, each of which is rotatably supported by said main housing for driving a respective vehicle wheel;
 an input shaft rotatably supported by said main housing for selective driving of each said main shafts; and
 a shift assembly drivingly connected to a respective one of said main shafts to intermediately drive an output shaft of said shift assembly for driving the respective vehicle wheel when connected thereto, wherein said output shaft connects to and drives the respective vehicle wheel in either of a hi-range mode or lo-range mode to shift driving operation of said output shaft between hi-speed and lo-speed operation;

said shift assembly comprising said output shaft for driving said vehicle wheel, an intermediate shaft, which is rotatable about said shaft axis, and a planetary gear assembly which transfers torque between said main shaft and said output shaft;

said planetary gear assembly comprising a sun gear rotatable with said intermediate shaft, a ring gear disposed radially outwardly of said sun gear, and a planetary carrier assembly comprising a planetary carrier rotatably supporting one or more planet gears thereon, wherein said planetary carrier is engaged with said output shaft for rotation together therewith and said planet gears rotate between said sun gear and said ring gear during rotation of said output shaft; and said shift assembly further including a shift member which is shiftable to connect said main shaft to either said intermediate shaft in a first shift mode or said planetary carrier assembly in a second shift mode, wherein shifting of said shift member shifts said shift assembly between said hi-range mode and said lo-range mode, said shift member in said first shift mode connecting said main shaft to said intermediate shaft to cause said intermediate shaft to rotate said sun gear and transfer torque along a first torque transmission path through said planetary carrier assembly to said output shaft, and said shift member in said second shift mode connecting said main shaft to said planetary carrier to cause said planetary carrier assembly to rotate said planet gears and transfer torque along a second torque transmission path through said planetary carrier assembly to said output path, wherein said first and second torque transmission paths rotate said output shaft at respective first and second speeds in response to rotation of said main shaft;

wherein said shift member is movably connected to said main shaft and is movable between first and second shift positions to connect said main shaft to either said intermediate shaft in said first shift position or said planetary carrier assembly in said second shift position, wherein said shift member in said first shift position causes said intermediate shaft to rotate said sun gear and transfer torque along said first torque transmission path through said planetary carrier assembly to said output shaft, and said shift member in said second shift position causes said planetary carrier assembly to rotate said planet gears and transfer torque along said second torque transmission path through said planetary carrier assembly to said output path;

wherein said first shift mode defines said lo-range mode and said second shift mode defines said hi-range mode;

wherein said shift member is shiftable axially along said shaft axis between said first and second shift positions; and wherein said shift member includes first and second drive formations, said first drive formations being engaged with said main shaft in said first and second shift positions, said intermediate shaft and said planetary carrier assembly further including respective third and fourth drive formations, wherein said second drive formations of said shift member engage said third drive formations of said intermediate shaft in said first shift position and engage said fourth drive formations of said planetary carrier assembly in said second shift position.

7. The vehicle drive unit according to claim 6, wherein said first and second drive formations are axially spaced apart with said first drive formations remaining engaged with said main shaft in both of said first and second shift modes, said third and fourth drive formations being axially spaced apart wherein said drive member is axially shiftable by an actuator to selectively engage said second drive formations with either said third or said fourth drive formations when in said first and second shift modes to transfer torque through said first and second transmission paths.

8. The vehicle drive unit according to claim 6, wherein said shift assembly includes a secondary housing, which rotatably supports said output shaft and said planetary carrier assembly, and said shift assembly is a modular assembly that is removably installed by mounting of said secondary housing to said main housing.

9. The vehicle drive unit according to claim 8, wherein said shift member of said shift assembly couples to said main shaft during mounting of said secondary housing on said main housing.

10. A vehicle drive unit for driving wheels of a vehicle comprising:
a drive unit sub-assembly comprising a main housing, one or more main shafts, each of which is rotatably supported by said main housing for driving a respective vehicle wheel, and an input shaft rotatably supported by said main housing for selective driving of each said main shaft; and
at least one shift assembly mounted as a sub-assembly to said drive unit sub-assembly so as to drivingly connect said main shaft to an output shaft of said shift assembly for driving a respective vehicle wheel, wherein said output shaft connects to and drives the respective vehicle wheel in either of a hi-range mode or lo-range mode to shift driving operation of said output shaft between hi-speed and lo-speed operation;
said shift assembly comprising a secondary housing mountable to said main housing, said output shaft rotatably supported on said secondary housing for driving said vehicle wheel, an intermediate shaft rotatable about said shaft axis, and a planetary gear assembly, which transfers torque between said main shaft and said output shaft;
said planetary gear assembly comprising a sun gear rotatable with said intermediate shaft, a ring gear disposed radially outwardly of said sun gear, and a planetary carrier assembly comprising a planetary carrier rotatably supporting one or more planet gears thereon, wherein said planetary carrier is engaged with said output shaft for rotation together therewith and said planet gears rotate between said sun gear and said ring gear during rotation of said output shaft;
wherein said shift assembly further includes an actuator with an actuator arm pivotally supported on said secondary housing, and a shift member, said shift member being supported on said actuator arm so as to be shiftable by said actuator to connect said main shaft to either said intermediate shaft in a first shift mode or said planetary carrier assembly in a second shift mode, wherein shifting of said shift member shifts said shift assembly between said hi-range mode and said lo-range mode, said shift member in said first shift mode connecting said main shaft to said intermediate shaft to cause said intermediate shaft to rotate said sun gear and transfer torque along a first torque transmission path through said planetary carrier assembly to said output shaft, and said shift member in said second shift mode connecting said main shaft to said planetary carrier to cause said planetary carrier assembly to rotate said planet gears and transfer torque along a second torque transmission path through said planetary carrier assembly to said output path, wherein said first and second torque transmission paths rotate said output shaft at respective first and second speeds in response to rotation of said main shaft.

11. The vehicle drive unit according to claim 10, wherein said actuator includes a hydraulic piston unit connected to said actuator arm to reversibly pivot said actuator arm and shift said shift member.

12. The vehicle drive unit according to claim 11, wherein said piston unit includes a piston shiftable between opposite first and second piston positions by hydraulic pressure and is mono-stable so as to maintain said piston in said first piston position and automatically return said piston to said first piston position when said piston is hydraulically depressurized.

13. The vehicle drive unit according to claim 12, wherein said piston is moved to said second piston position by said hydraulic pressure and is moved back to said first piston position by a biasing member configured as a spring.

14. The vehicle drive unit according to claim 11, wherein said piston unit includes a piston shiftable between opposite first and second piston positions by hydraulic pressure and is bi-stable by remaining in position until hydraulically moved to the other of said first and second positions.

15. The vehicle drive unit according to claim 14, which includes a lock device which maintains said piston in said first piston position and in said second piston position when said piston is hydraulically depressurized such that movement is effected by said hydraulic pressure.

16. The vehicle drive unit according to claim 11, wherein said piston unit includes a piston shiftable between opposite first and second piston positions wherein said piston moves to said second piston position by said hydraulic pressure and said piston returns to said first piston position by spring biasing when said piston is hydraulically depressurized, said piston unit including a lockout device so as to be bi-stable wherein said lockout device holds said piston in said second position even when hydraulically depressurized and said lockout device is releasable to unlock said piston and permit return to said first piston position by said spring biasing.

17. The vehicle drive unit according to claim 11, which includes a clutch assembly which selectively couples and decouples torque transmission between said input shaft and said main shaft for selective connection and disconnection of said secondary drive unit, said secondary drive unit further including a main control circuit for controlling said clutch assembly, and a secondary shift control circuit to control shifting between the hi-range and lo-range modes.

18. The vehicle drive unit according to claim 17, wherein said secondary shift control circuit includes a first valve that is operable to selectively pressurize and shift from said hi-range mode to said lo-range mode and a second valve that is operable to selectively pressurize and shift from said lo-range mode to said hi-range mode.

19. The vehicle drive unit according to claim 17, wherein said secondary shift control circuit includes a valve that is normally closed but is operable to selectively pressurize and shift from one of said hi-range and lo-range modes to the other and selectively depressurize when closed to shift to the other of said hi-range and lo-range modes so that said actuator is mono-stable.

20. The vehicle drive unit according to claim 17, wherein said secondary shift control circuit includes a valve that is normally closed but is operable to selectively pressurize and shift from one of said hi-range and lo-range modes to the other and selectively depressurize when closed to shift to the other of said hi-range and lo-range modes by said biasing member so that said actuator is mono-stable.

* * * * *

UNITED STATES PATENT AND TRADEMARK OFFICE
CERTIFICATE OF CORRECTION

PATENT NO. : 11,890,927 B2
APPLICATION NO. : 17/428673
DATED : February 6, 2024
INVENTOR(S) : Ekonen et al.

Page 1 of 1

It is certified that error appears in the above-identified patent and that said Letters Patent is hereby corrected as shown below:

On the Title Page

Item (72):
"(72) Inventors: Todd Ekonen, Brighton, MI (US); Michael Burr, Farmington, MI (US); Mitchell Holland, Royal Oak, MI (US), Kyle Milliman, Farmington Hills, MI (US); Gary Monkaba, Troy, MI (US); Evan Swinger, Farmington Hills, MI (US); Jayson Allison, Livonia, MI (US); Sean Hayes, Livonia, MI (US); Simon Joliff, Livonia, MI (US); Joe Schaffer, New Hudson, MI (US)"

Should be:
-- (72) Inventors: Todd Ekonen, Brighton, MI (US); Michael Burr, Farmington, MI (US); Mitchell Holland, Royal Oak, MI (US), Kyle Milliman, Farmington Hills, MI (US); Gary Monkaba, Troy, MI (US); Evan Swinger, Farmington Hills, MI (US); Jayson Allison, Livonia, MI (US); Sean Hayes, Livonia, MI (US); Simon Jolliff, Livonia, MI (US); Joe Schaffer, New Hudson, MI (US) --

Signed and Sealed this
Seventh Day of May, 2024

Katherine Kelly Vidal
*Director of the United States Patent and Trademark Office*